United States Patent
Cabourg

(10) Patent No.: US 10,252,809 B2
(45) Date of Patent: Apr. 9, 2019

(54) SEPARATING ELEMENT FOR A PLATFORM CABIN COMPRISING A PUSH ROD MECHANISM FOR MOVING A LEAF

(75) Inventor: Frédéric Cabourg, Puteaux (FR)

(73) Assignee: DASSAULT AVIATION, Paris (FR)

( * ) Notice: Subject to any disclaimer, the term of this patent is extended or adjusted under 35 U.S.C. 154(b) by 1782 days.

(21) Appl. No.: 13/554,442

(22) Filed: Jul. 20, 2012

(65) Prior Publication Data

US 2013/0020439 A1    Jan. 24, 2013

(30) Foreign Application Priority Data

Jul. 22, 2011    (FR) ..................... 11 02297

(51) Int. Cl.
*B64D 25/00*    (2006.01)
*B64C 1/14*    (2006.01)
*B64D 11/00*    (2006.01)
*E05F 15/649*    (2015.01)

(52) U.S. Cl.
CPC ............ *B64D 25/00* (2013.01); *B64C 1/1438* (2013.01); *B64D 11/0023* (2013.01); *E05F 15/649* (2015.01)

(58) Field of Classification Search
CPC .. B61D 19/005; B61D 19/002; B61D 19/006; E05F 17/004; E05F 11/382; E05F 11/445; E05F 11/04; E05F 11/54; E01F 13/06; E01F 13/04; B64D 29/06; B64D 29/08; B64C 1/14; B64C 1/1446; B64C 1/1407; B64C 1/1415; B64C 1/143; B64C 1/1469; B64C 1/1423; B64C 1/1438
See application file for complete search history.

(56) References Cited

U.S. PATENT DOCUMENTS

| 639,345 | A | * | 12/1899 | Bradford | 49/233 |
| 1,047,368 | A | * | 12/1912 | Baxter | 49/233 |
| 1,343,023 | A | * | 6/1920 | Bach | 49/117 |
| 1,863,497 | A | * | 6/1932 | Nelson | 49/117 |
| 1,963,415 | A | * | 6/1934 | Mattson | 49/233 |
| 3,136,538 | A | * | 6/1964 | Kessner et al. | 49/117 |

(Continued)

FOREIGN PATENT DOCUMENTS

| CA | 2 624 037 A1 | 9/2009 |
| DE | 196 48 712 A1 | 5/1998 |

(Continued)

OTHER PUBLICATIONS

Search Report dated Jun. 14, 2012 for French Application No. FR1102297.

*Primary Examiner* — Katherine W Mitchell
*Assistant Examiner* — Shiref M Mekhaeil
(74) *Attorney, Agent, or Firm* — Davidson, Davidson & Kappel, LLC

(57) ABSTRACT

A separating element for a platform cabin is provided. The separating element comprises: at least one stationary partition, delimiting a passage defining a circulation axis inside the cabin; at least one leaf, mounted transversely movable relative to the circulation axis between a closed position, in which it extends through the passage, and an open position, in which it is positioned at least partially spaced away from the passage; and means for moving the or each leaf between the closed position and the open position thereof, the or each leaf being adapted to move along the plane transverse to the circulation axis.

12 Claims, 19 Drawing Sheets

(56) References Cited

U.S. PATENT DOCUMENTS

| | | | |
|---|---|---|---|
| 3,857,197 A * | 12/1974 | Reddy et al. | 49/13 |
| 4,736,641 A | 4/1988 | Reid | |
| 4,911,219 A * | 3/1990 | Dalrymple | 160/118 |
| 4,989,808 A * | 2/1991 | Spraggins et al. | 244/118.5 |
| 5,573,287 A * | 11/1996 | Takimoto | 292/29 |
| 5,921,613 A * | 7/1999 | Breunig et al. | 296/155 |
| 6,186,444 B1 * | 2/2001 | Steel | 244/129.5 |
| 8,091,285 B1 * | 1/2012 | Wolf et al. | 49/463 |
| 2009/0078824 A1 * | 3/2009 | Osborne et al. | 244/119 |
| 2012/0151841 A1 * | 6/2012 | Rahardjo et al. | 49/426 |
| 2012/0251092 A1 * | 10/2012 | Zwaan et al. | 396/428 |
| 2013/0020369 A1 * | 1/2013 | Ple | 225/1 |
| 2013/0111835 A1 * | 5/2013 | Harter et al. | 52/238.1 |
| 2015/0210373 A1 * | 7/2015 | Guimont et al. | 244/129.4 |

FOREIGN PATENT DOCUMENTS

| | | |
|---|---|---|
| EP | 0 644 309 A1 | 3/1995 |
| FR | 2 209 392 A5 | 6/1974 |
| FR | 2 744 756 A1 | 8/1997 |
| WO | 2006/128694 A1 | 12/2006 |

* cited by examiner

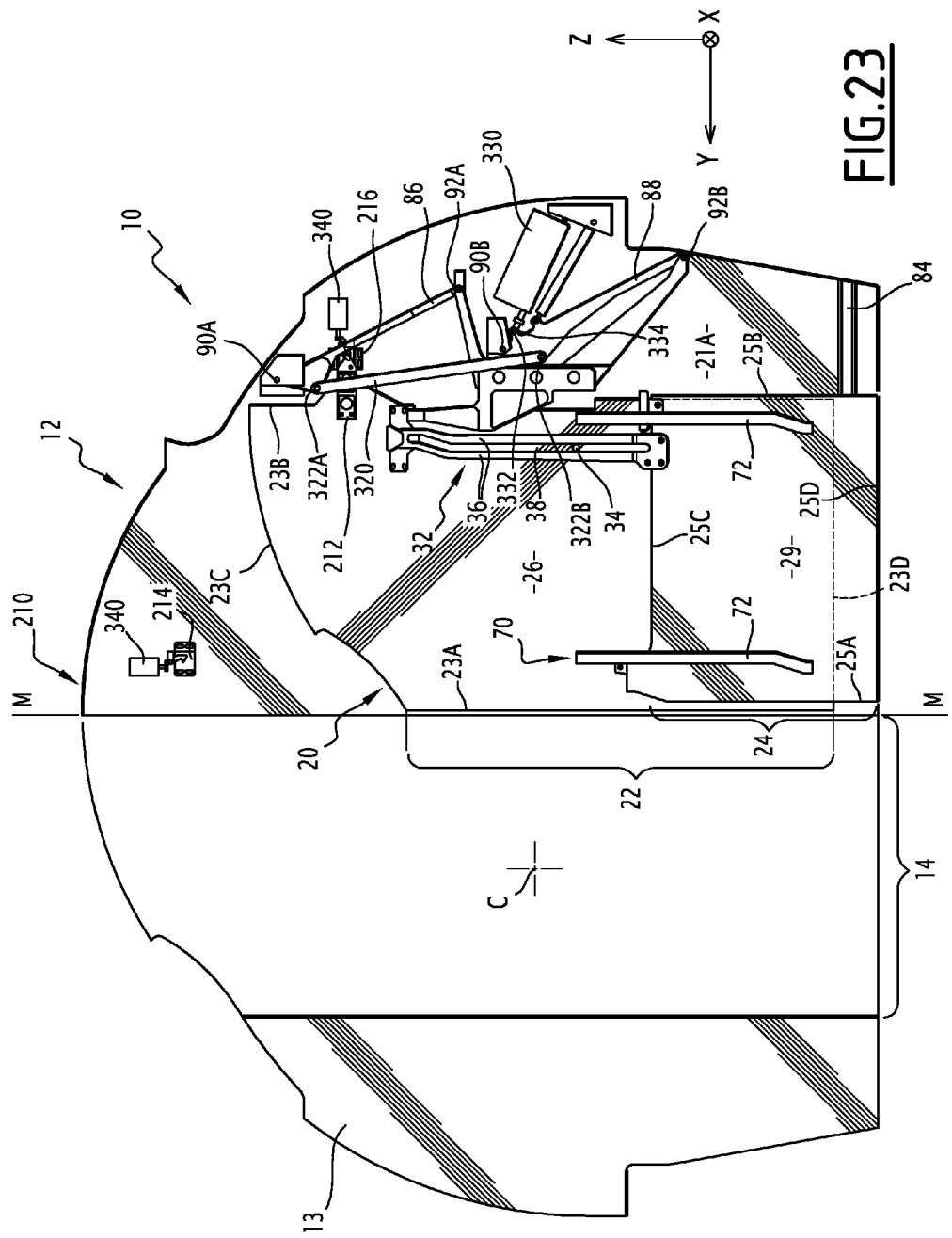

SEPARATING ELEMENT FOR A PLATFORM CABIN COMPRISING A PUSH ROD MECHANISM FOR MOVING A LEAF

CROSS-REFERENCE TO RELATED PATENT APPLICATIONS

This application claims benefit of French Application No. 11 02297 filed Jul. 22, 2011, which is hereby expressly incorporated by reference in its entirety.

BACKGROUND OF THE INVENTION

Field of the Invention

The present invention relates to a separating element for a platform cabin, of the type comprising:
- at least one stationary partition, delimiting a passage defining a circulation axis inside the cabin,
- at least one leaf, mounted transversely movable relative to the circulation axis between a closed position, in which it extends through the passage, and an open position, in which it is positioned at least partially spaced away from the passage, and
- means for moving the or each leaf between the closed position and the open position thereof, the or each leaf being adapted to move along the plane transverse to the circulation axis.

"Platform" refers both to an aircraft and boat or, more generally, any vehicle having an enclosure that is at least partially cylindrical.

Description of the Related Art

Such separating elements are known. U.S. Pat. No. 6,186,444 for example describes a separating element for an aircraft cabin comprising two stationary partitions defining a circulation passage through the aircraft between them, and a door formed from two leaves. Each leaf is movably mounted on a stationary partition between a closed position, in which it extends across the passage, and an open position, in which it is positioned spaced away from the passage, retracted inside the stationary partition. Slide means allow each leaf to move between the open and closed positions thereof.

However, this separating element is not fully satisfactory. In fact, the travel of the leaves is limited by the fuselage of the aircraft, due to the substantially cylindrical configuration thereof. This limited travel restricts the width of the passage when said separating element is installed in a narrow fuselage airplane, such as a business airplane.

SUMMARY OF THE INVENTION

One aim of the invention is therefore to propose a cabin separating element adapted to maximize the travel of the leaf between the open and closed positions thereof. Other aims of the invention are to improve the rigidity of the separating element, and to simplify the manufacture and maintenance thereof.

To that end, the invention relates to a separating element of the aforementioned type, in which the movement means comprise a mechanism for moving at least part of the leaf, the mechanism comprising two push rods each articulated, by a first point of articulation to a point of the partition, and by a second point of articulation to a point integral with the leaf portion, the first points of articulation being spaced apart from one another.

According to preferred embodiments of the invention, the separating element comprises one or more of the following features:
- the points of articulation form the four apices of a parallelogram irrespective of the position of the leaf;
- the or each leaf includes first and second leaf portions, movable relative to one another, and means for relative guiding of the first leaf portion relative to the second leaf portion;
- one of the leaf portions can be translated along a movement axis in the transverse plane, the pushrods being articulated on the other leaf portion;
- the relative guide means include means for relative transverse shimming of the leaf portions, said shim means having at least one guide extending along an axis perpendicular to the axis of movement, secured to one of the leaf portions, a movement member, secured to the other leaf portion, received in the guide, and return means for returning the movement member to bear against the associated guide;
- the relative guide means include a slide secured to one of the leaf portions and a guide member secured to the other leaf portion, the guide member being adapted to cooperate with the slide so as to guide the first leaf portion relative to the second leaf portion;
- the separating element has first means for limiting the travel of the leaf along the circulation axis, said first limiting means having at least one protrusion, advantageously a rolling member, secured to one of the push rods and adapted to bear against the partition;
- the partition has two panels delimiting a space between them for receiving the leaf when it is in the open position, the separating element having second means for limiting the travel of the leaf along the circulation axis, said second limiting means having at least two extensions, each secured to a partition panel, and at least two skates secured to the portion of the leaf, each skate being adapted to be sandwiched between an extension and the leaf portion when the leaf is in the closed position;
- the separating element includes third means for limiting the travel of the leaf along the circulation axis, said third limiting means including a fastening member jointly movable with the mechanism and a slide for receiving the fastening member, formed in the partition, the fastening member cooperating with the slide between an intermediate position of the leaf and the closed position to prevent the leaf from moving away from the partition when the leaf is in the closed position;
- the fastening member is pivotably mounted on the mechanism between an idle position, in which is retracted substantially in a plane defined by the mechanism, and a position retaining the leaf, in which it is deployed substantially perpendicular to said plane;
- the separating element includes a system for adjusting the position of the leaf relative to the mechanism along two axes comprised in the transverse plane;
- the adjustment system includes a support secured to one of the mechanism and the leaf portion, a flange secured to the other of the leaf portion and the mechanism, and at least one cam lock, the or each cam lock having a large cylinder portion and a small cylinder portion that is off-center relative to the large cylinder portion, the flange having at least one opening for receiving the large cylinder portion, and the support having at least one elongate slot for receiving the small cylinder portion;

the separating element has a first stationary partition and a second stationary partition opposite it, the passage being delimited between the stationary partitions;

the separating element has two opposite leaves, each leaf being movably mounted on one of the stationary partitions by a movement mechanism of at least one portion of the leaf, said mechanism having two push rods articulated to two spaced apart points of the stationary partition and said portion of the leaf;

the separating element includes a system for locking the leaf in the open position and the closed position, the locking system having a movable locking member secured to the leaf and a device for actuating said movable locking member, in which the actuating device has a handle for actuating the movable locking member, positioned on a large surface of the leaf portion, and a button for actuating movable locking member, positioned on the edge of the leaf portion;

the locking system comprises an actuating rod of the movable locking member and a rotary bar advantageously formed by a piece with three arms, the bar being respectively connected to the locking member by the actuating rod, to an actuating handle, and to a button;

the separating element has a system for locking the leaf in the open position and in the closed position, the locking system having a movable locking member secured to the leaf and two stationary locking members secured to the partition, one stationary locking member cooperating with the movable locking member to lock the leaf in the open position, and the other stationary locking member cooperating with the movable locking member to lock the leaf in the closed position;

the stationary locking members have identical structures, the structure of each stationary locking member being oriented differently from that of the other stationary locking member;

in at least one first position of the leaf, the first and second points of articulation of each push rod are vertically aligned; and in at least one second position of the leaf, the first and second points of articulation of the two push rods are aligned with one another.

BRIEF DESCRIPTION OF THE DRAWINGS

Other features and advantages of the invention will appear upon reading the following description, provided solely as an example and done in reference to the appended drawings, in which:

FIG. 23 is a view similar to FIG. 17, the leaf being in an open position.

DETAILED DESCRIPTION OF CERTAIN ILLUSTRATIVE EMBODIMENTS

Figure 1:
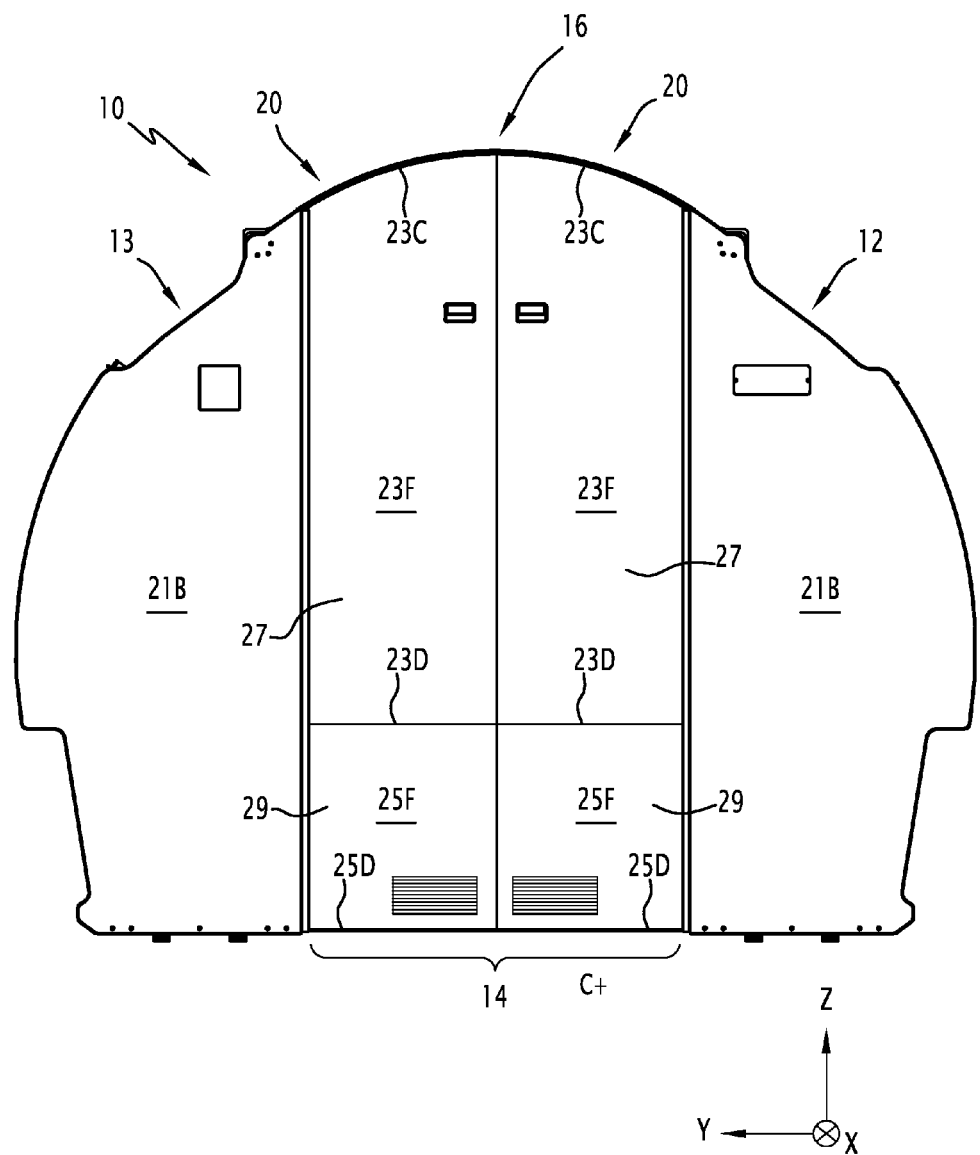
FIG. 1 is a rear elevation view of a separating element according to a first embodiment of the invention.

The separating element 10, shown in FIG. 1, is an element for separating an aircraft cabin. It is intended to be installed inside the fuselage of the aircraft, between the fuselage and a cabin floor (not shown), transverse to the direction of extension of the fuselage, to separate the cabin into two compartments.

Hereafter, the orientation terms will be used in reference to the standard orientation of an aircraft, shown in the Figures, in which:

the X axis is a longitudinal axis and extends from the tail toward the nose of the aircraft, the Y axis is a transverse axis and extends from the right to the left of the aircraft, for an observer facing the nose of the aircraft, and the Z axis is a vertical axis and extends from bottom to top, the X and Y axes together defining a horizontal plane, the X and Z axes together defining a longitudinal plane, and the Y and Z axes together defining a transverse plane.

The width of the separating element 10, defined horizontally in the transverse plane, is substantially equal to the inner diameter of the fuselage. In particular, the width is defined as the greatest distance along the transverse axis Y separating two points of the separating element 10.

The separating element 10 comprises two stationary partitions 12, 13 delimiting a passage 14 between them, and a door 16 to selectively obstruct the passage 14 for free the passage 14.

The passage 14 defines a circulation axis C inside the cabin, substantially combined with the longitudinal axis X.

The door 16 has two leaves 20, each leave 20 being movably mounted on a partition 12, 13 between a closed position, in which the leaf 20 extends across the passage 14, and an open position, in which it is positioned spaced away from the passage 14.

Each leaf 20 is adapted to move along a transverse plane between the open and closed positions thereof. In other words, each leaf 20 is adapted to be oriented perpendicular to the longitudinal axis X along its entire movement between the open and closed positions thereof.

Figure 2:
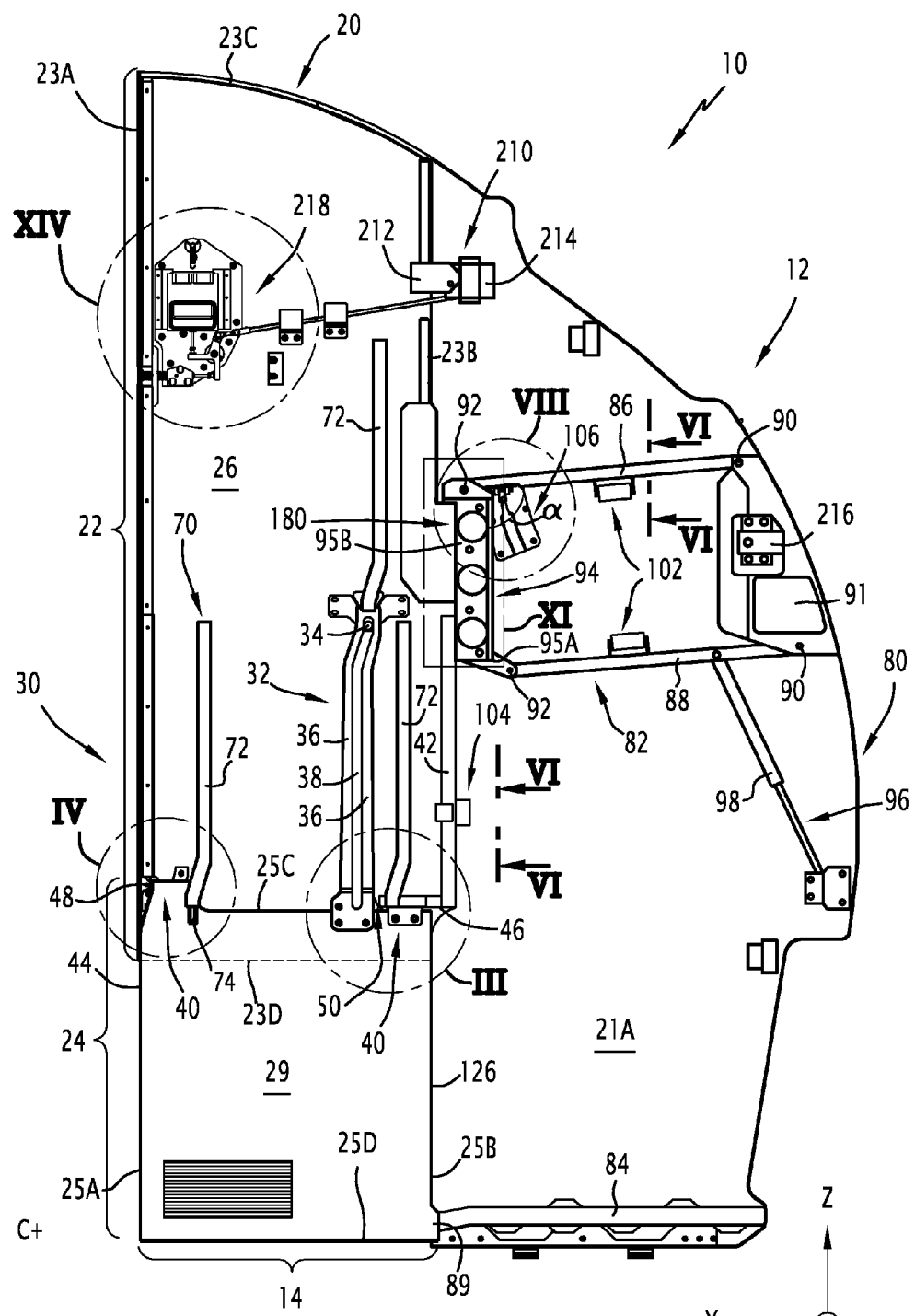
FIG. 2 is a rear elevation view, in partial cross-section, of half of the separating element of FIG. 1, one leaf of the separating element being in the closed position.

In reference to FIGS. 1 and 2, each stationary partition 12 comprises a front partition panel 21A (FIG. 2) and a rear partition panel 21B (FIG. 1) defining a space 18 between them (FIG. 6) for receiving the leaf 20 in the open position.

FIG. 2 shows only the right leaf 20 and partition 12, the leaf 20 being shown in the closed position.

As shown in this Figure, the leaf 20 comprises a first upper portion 22 and a second lower portion 24, the two portions 22, 24 being mounted vertically movably relative to one another.

Alternatively, the first leaf portion 22 constitutes a lower portion of the leaf 20, and the second leaf portion 24 constitutes an upper portion of the leaf 20.

The first leaf portion 22 is also referred to as "driven leaf portion".

Each leaf portion, 22, 24, respectively, comprises an inner lateral edge 23A, 25A, respectively, oriented toward the passage 14, an outer lateral edge 23B, 25B, respectively, oriented toward the partition 12, an upper edge 23C, 25C, respectively, a lower edge, 23D, 25D, respectively, a front surface 23E, 25E, respectively (FIG. 5), and a rear surface 23F, 25F, respectively (FIG. 1).

The two leaf portions 22, 24 are also movably mounted transversely relative to one another, so as to allow the vertical alignment of the inner lateral edges 23A, 25A when the leaf 20 is in the closed position. This aspect is described in more detail later in the description.

The first leaf portion 22 comprises a front panel 26 and a rear panel 27 (FIG. 1) defining a space 28 between them (FIG. 5) for receiving the second portion 24. The front panel 26 defines the front surface 23E of the first leaf portion 22, and the rear panel 27 defines the rear surface 23F of the first leaf portion 22.

The second leaf portion 24 comprises a single panel 29 defining both the front 25E and rear 25F surfaces of the leaf portion 24.

The leaf 20 comprises means 30 for relative vertical guiding of the first portion 22 in relation to the second portion 24. These vertical guiding means 30 are housed inside the space 28.

The vertical guiding means 30 comprise a slide 32, secured to the second leaf portion 24, and a guiding member 34, secured to the first leaf portion 22 and adapted to cooperate with the slide 32 to vertically guide the first leaf portion 22 relative to the second leaf portion 24. The slide 32 comprises two bars 36 elongated in a substantially vertical direction and parallel to one another. The bars 36 delimit a slit 38 between them for guiding the member 34. The member 34 is advantageously, as shown, a slug protruding rearward from the front panel 26 and received in the slit 38.

The vertical guiding means 30 also comprise means 40 for relative transverse shimming of the first leaf portion 22 relative to the second leaf portion 24. These shimming means 40 comprise two vertical guides 42, 44, two movement members 46, 48, and means 50 for returning one of the movement members 46, 48 to bear against the associated guide 42, 44.

Each guide 42, 44 is elongated in a substantially vertical direction. Each member 46, 48 is adapted to cooperate with a specific guide 42, 44.

Figure 3:
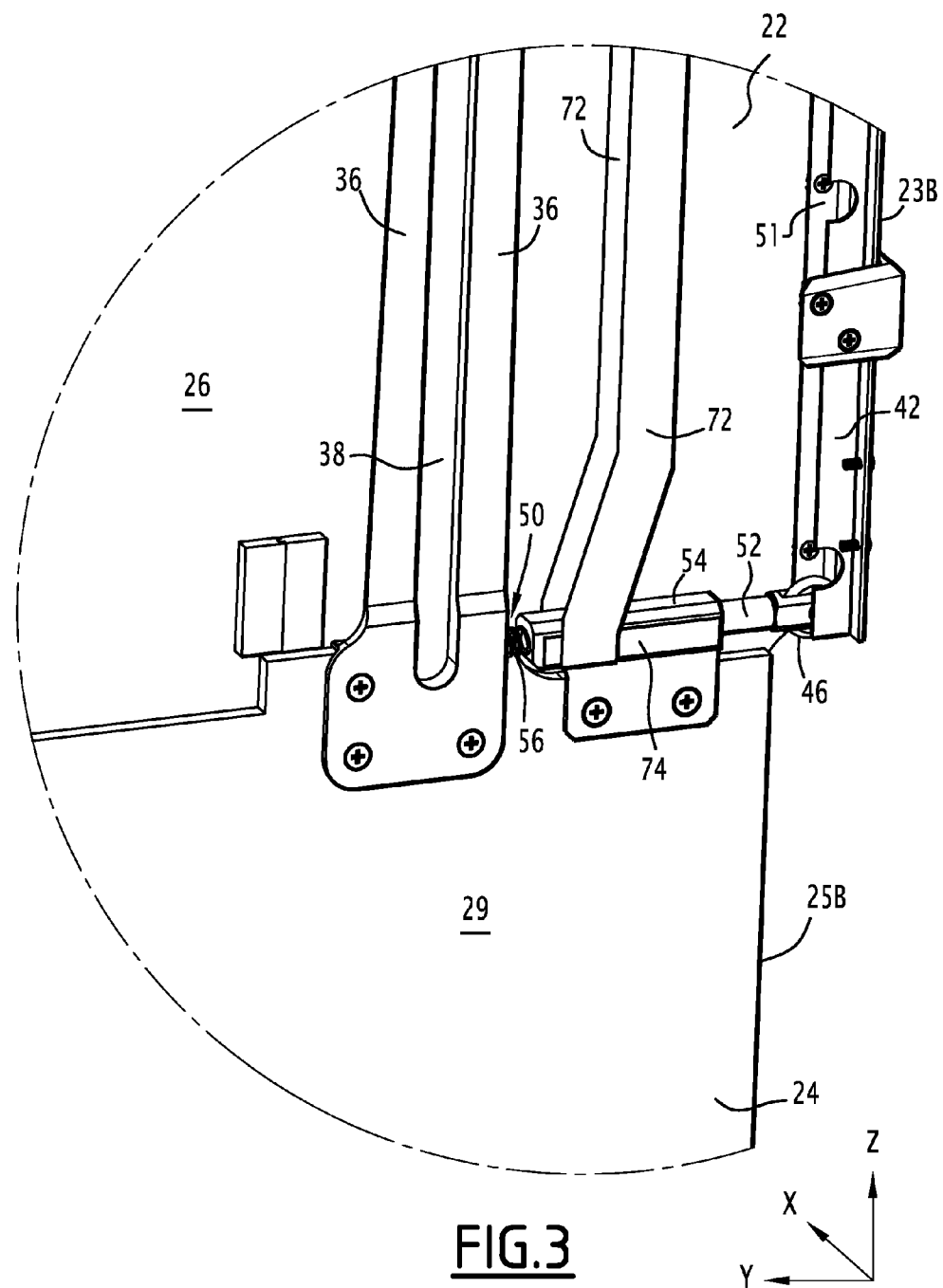
FIG. 3 is a rear perspective view, in partial cross-section, of a detail marked III in FIG. 2.

As visible in FIG. 3, a first guide 42 is formed by a metal profile secured to the first leaf portion 22. In the illustrated example, the profile 42 is secured along the lateral edge 23B of the first leaf portion 22. It delimits a trench 51 oriented towards the inside of the first leaf portion 22.

The associated movement member 46 is made up of a first roller secured to the second leaf portion 24. It is received in the trench 51 and is adapted to roll inside the trench 51.

More specifically, the first roller 46 is mounted on a transverse arm 52, transversely movable inside a chamber 54 for guiding the arm 52 secured to the panel 29.

The return means 50 transversely stress the arm 52, toward the outside of the second leaf portion 24. In the illustrated example, the return means 50 are made up of a spring inserted between a transverse end (not shown) of the arm 52 and the stop surface 56 secured to the panel 29. The chamber 54 is fastened on the upper edge 25C of the second leaf portion 24.

Figure 4:
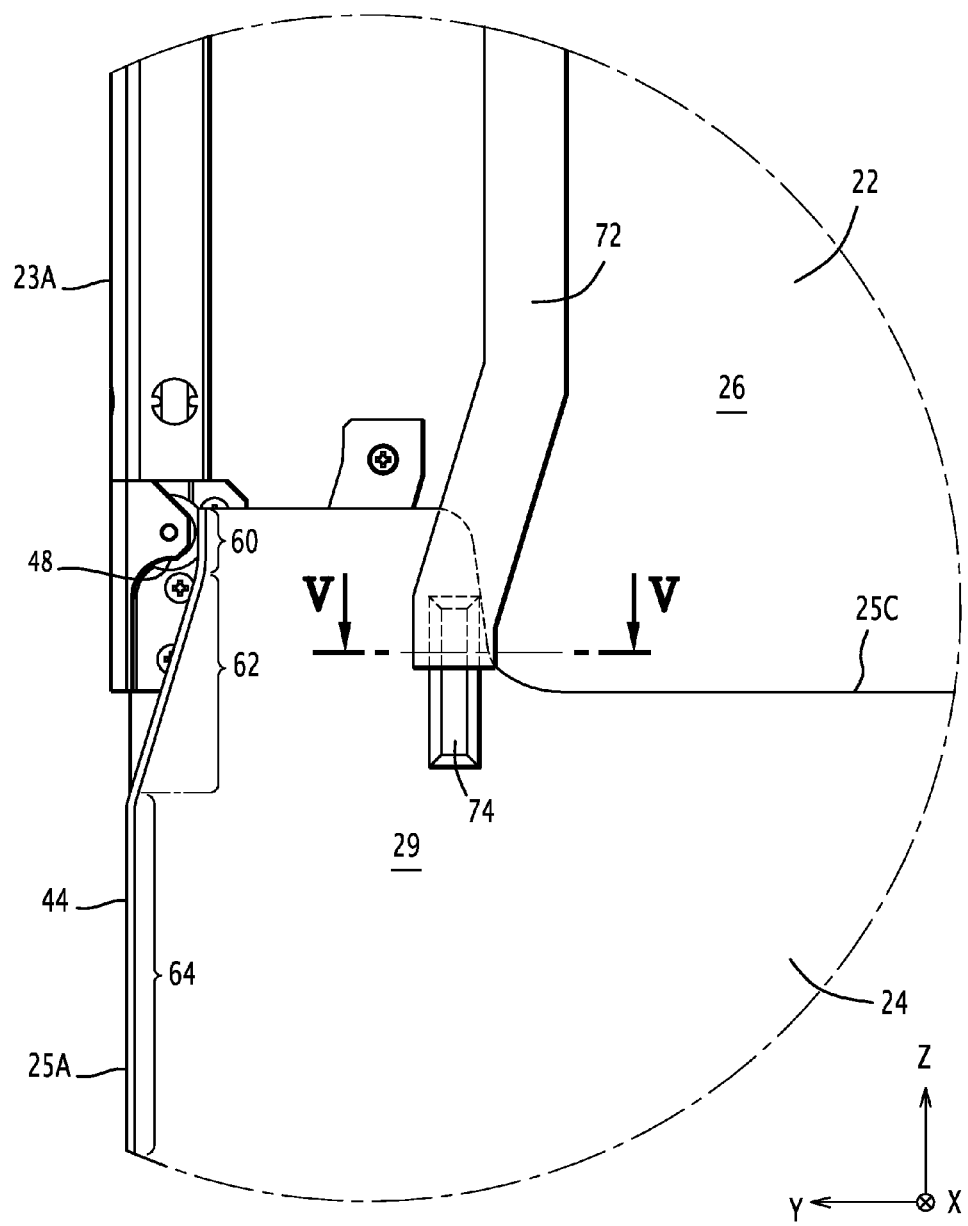
FIG. 4 is a rear view, in partial cross-section, of a detail marked IV in FIG. 2.

As shown in FIG. 4, the second guide 44 is made up of a track formed in the lateral edge 25A of the second leaf portion 24, opposite the lateral edge 23B of the first leaf portion 22 along which the first guide 42 is fastened.

In the illustrated example, the guide 44 comprises an upper portion 60 oriented substantially vertically, an intermediate portion 62 inclined toward the lateral edge 25A, and a lower portion 64 oriented substantially vertically, parallel to the upper portion 60. The upper portion 60 is thus transversely offset towards the inside of the leaf portion 24 relative to the lower portion 64.

This offset is such that, when the movement member 48 bears against the upper portion 60, the inner lateral edges 23A, 25A of the two leaf portions 22, 24 are vertically aligned. Thus, when the leaf 20 is in the closed position, it has a satisfactory aesthetic appearance.

The associated movement member 48 is made up of a second roller secured to the first leaf portion 22 and adapted to roll on the track forming the second guide 44. The second roller 48 is mounted close to the lateral edge 23A of the first leaf portion 22. It is transversely stationary relative to the first leaf portion 22.

Under the effect of the bearing force of the first roller 46 against the profile 42, the second leaf portion 24 is stressed transversely away from the first leaf portion 22. Under the effect of this force, the second roller 48 is stressed bearing against the guide 44, and the bearing force of the second roller 48 against the guide 44 opposes the bearing force of the first roller 46 against the profile 42. Owing to this configuration, the roller 48 can therefore faithfully follow the guide 44, and the relative transverse position of the two leaf portions 22, 24 is completely controlled. The return means 50 make it possible to offset any manufacturing irregularities.

Alternatively, the two guides 42, 44 are secured to a same leaf portion 22, 24, the two movement members 46, 48 being secured to the other leaf portion 22, 24.

Figure 5:
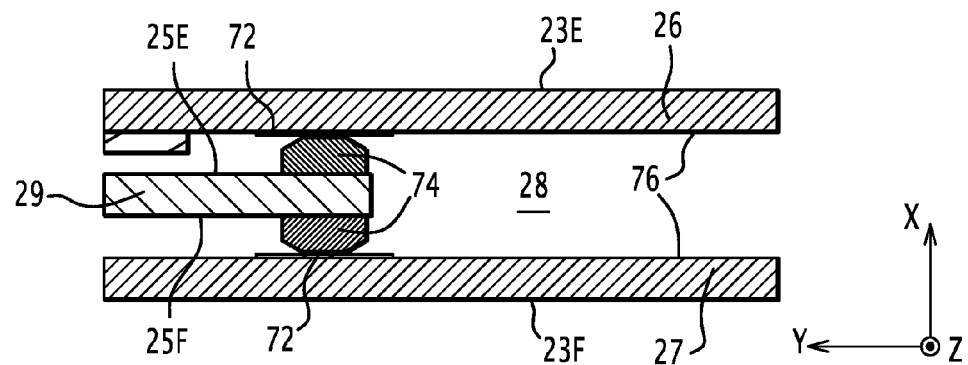
FIG. 5 is a cross-sectional view of the separating element along a plane marked V-V in FIG. 4.

The vertical guide means 30 also comprise means 70 for relative longitudinal shimming of the first and second leaf portions 22, 24. These longitudinal shimming means 70 comprise, as shown in FIGS. 4 and 5, slip bands 72, secured to the first leaf portion 22, and skates 74, secured to the second leaf portion 24 and adapted to bear against the slip bands 72.

Each slip band 72 extends substantially vertically, along an inner surface 76 of the panel 26, 27 of the leaf portion 22. "Inner surface 76" refers to the surface of the panel 26, 27 oriented toward the space 28 for receiving the leaf portion 24 in the closed position of the leaf 20. The inner surface 76 of the front panel 26 is thus opposite the front surface 23E of the leaf portion 22, and the inner surface 76 of the rear panel 27 is opposite the rear surface 23F of the leaf portion 22.

The slip bands 72 are longitudinally aligned two by two. In other words, for each slip band 72 positioned along the inner surface 76 of a panel 26, 27, respectively, another slip band 72 is opposite it on the inner surface 76 of the opposite panel 27, 26. In the illustrated example, there are three pairs of slip bands 72.

Each skate 74 is placed on the front surface 25E or rear surface 25F of the leaf portion 24. Preferably, each skate 74 is placed close to the upper edge 25C of the leaf portion 24 such that, when the leaf 20 is in the open position, the skate 74 is inside the receiving space 28.

Each skate 74 is positioned opposite a slip band 72. Like the slip bands 72, the skates 74 are longitudinally aligned two by two, i.e. for each skate 74 positioned on a surface 25E, 25F of the leaf portion 24, another skate 74 is positioned on the other surface 25E, 25F, such that said two skates 74 are longitudinally aligned.

As shown in FIG. 5, the skates 74 are sized so that each skate 74 bears against the slip band 72 facing it. To that end, each skate 74 has a longitudinal thickness substantially equal to half the longitudinal thickness of the space 28, deducting the longitudinal thickness of the panel 29.

Preferably, as shown, there are at least six skates 74.

Each pair formed by a slip band 72 and the skate 74 facing it has a low coefficient of friction. In other words, the slip band 72 and the skate 74 of a same pair are adapted so that they can slide on one another without friction. Typically, the slip band 72 is made from aluminum and the skate 74 is made from Teflon®, or vice versa.

In this way, the leaf portions 22, 24 are in constant contact in the longitudinal direction X, which prevents any travel of the second leaf portion 24 relative to the first leaf portion 22. Furthermore, the points of contact are limited and the friction at said points of contact is reduced, which provides good relative mobility of the two leaf portions 22, 24.

Returning to FIG. 2, the separating element 10 also comprises means 80 for moving the leaf 20 relative to the partition 12. According to the invention, these movement means 80 comprise a mechanism 82 for moving the first leaf portion 22, and a rail 84 for moving the second leaf portion 24.

The mechanism 82, the rail 84, respectively, is adapted to guide the translation of the first leaf portion 22, of the second leaf portion 24, respectively, inside the transverse plane.

The mechanism 82 comprises two movement push rods 86, 88, each push rod 86, 88 being articulated at a first point of articulation 90 to a stationary point of the partition 12, in particular by means of a fitting 91, and at a second point of articulation 92 to a point jointly movable with the first leaf portion 22, by means of a connecting element 94.

The first points of articulation 90 are spaced apart from one another. Likewise, the second points of articulation 92 are spaced apart from one another.

The connecting element 94 is elongate in a substantially vertical direction. It includes a support 95A, secured to the mechanism 82, and a clip 95B, secured to the first leaf portion 22, sandwiching the support 95A.

The push rods 86, 88 are substantially parallel to one another and are adapted to remain substantially parallel during the movement of the leaf 20 from the open position to the closed position thereof. To that end, the lengths separating the first and second points of articulation 90, 92 of each connecting rod 86, 88 are substantially equal. In this way, the points of articulation 90, 92 form the four apices of a parallelogram.

Figure 9:
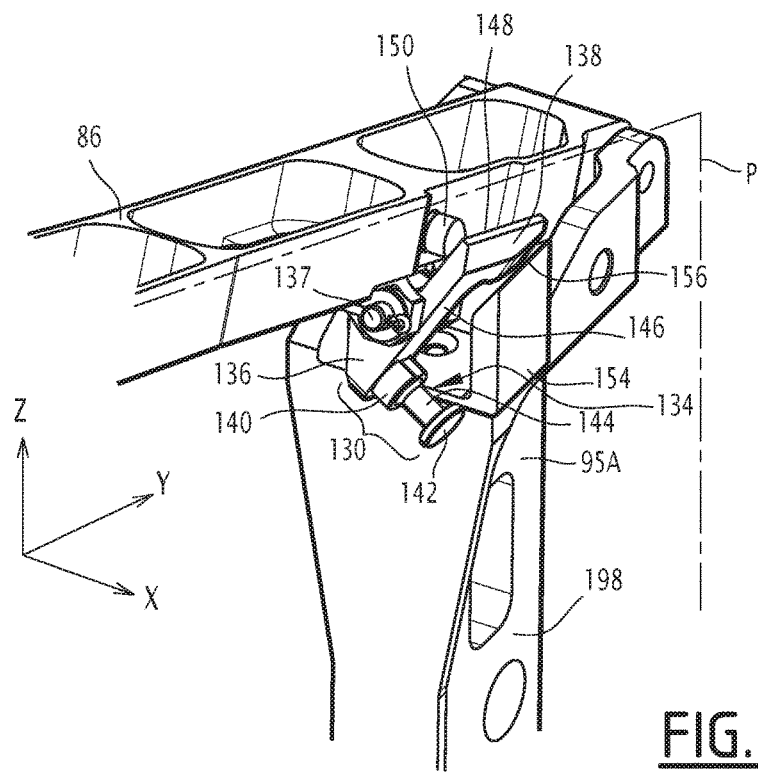
FIG. 9 is a three-quarters frontal perspective view of a detail of a mechanism for moving the separating element of FIG. 1.

The mechanism 82 is thus substantially in the shape of a parallelogram. It defines a substantially transverse plane P (FIG. 9).

In the illustrated example, the first and second points of articulation 90, 92 constitute the ends of each movement push rod 86, 88, and the lengths of the movement push rods 86, 88 are substantially equal.

The movement rail 84 is substantially rectilinear and extends substantially horizontally. It is secured to the partition 12. It is adapted to cooperate with a guided member 89 of the leaf portion 24 to guide the leaf portion 24 along the transverse axis Y.

The separating element 10 also comprise means 96 for compensating for the weight of the first leaf portion 22 on the mechanism 82. These compensating means 96 comprise a gas cylinder 98 articulated, at a first end, to a point of the partition 12, and, at the second end, to one of the push rods 86, 88. Alternatively, a spring-loaded actuator is substituted for the gas cylinder 98.

The separating element 10 also comprises means for limiting the travel of the leaf 20 in the direction of circulation C. These limiting means comprise first 102, second 104, and third 106 limiting means.

Figure 6:
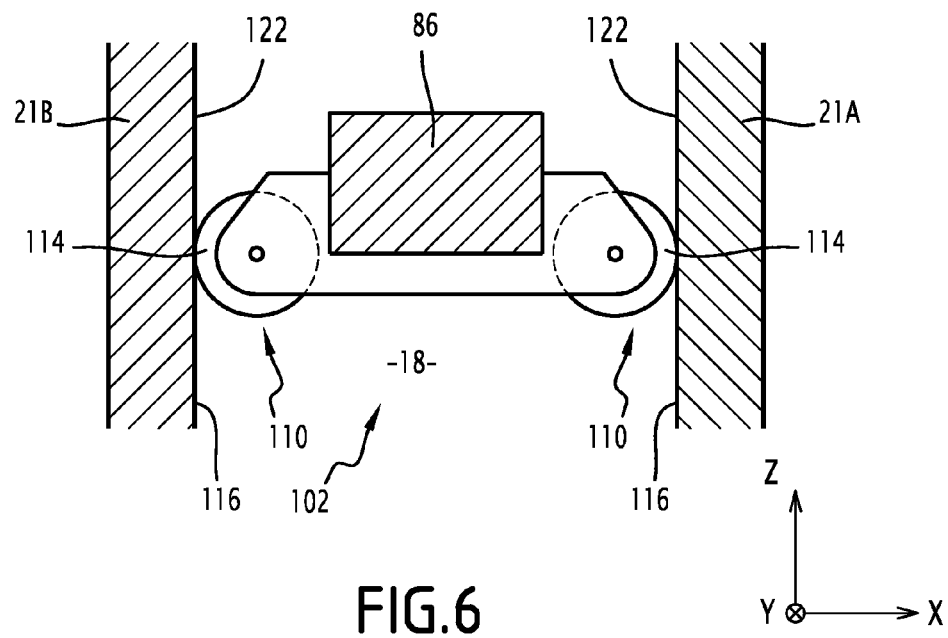
FIG. 6 is a cross-sectional view of the separating element along a plane marked VI-VI in FIG. 2.

As illustrated by FIG. 6, the first limiting means 102, also referred to as "primary limiting member", comprises protrusions 110 secured to the movement push rods 86, 88. Each protrusion 110 protrudes longitudinally from the plane P of the mechanism 82 forward or backward.

The protrusions 110 are in particular grouped together in pairs, one protrusion 110 of each pair protruding longitudinally forward and the other protrusion 110 protruding longitudinally backward. The protrusions 110 of each pair are longitudinally aligned and are secured to the same movement push rod 86, 88. Preferably, at least one pair of protrusions 110 is secured to each push rod 86, 88. In the illustrated example, a single pair of protrusions 110 is secured to each push rod 86, 88.

Each protrusion 110 is adapted to bear against a partition panel 21A, 21B of the stationary partition 12. In particular, each protrusion 110 is adapted to remain bearing against said partition panel 21A, 21B when the leaf 20 is moved from the open position to the closed position thereof. The mechanism 82 is thus longitudinally guided between the partition panels 21A, 21B when the leaf 20 is moved.

Preferably, each protrusion 110 comprises a roll 114, the roll 114 defining a bearing surface against the associated partition panel 21A, 21B. The roll 114 is adapted to roll against a rolling surface 116 defined by said associated partition panel 21A, 21B, when the leaf 20 is moved from the open position to the closed position thereof. To that end, the axis of each roll 114 is preferably oriented parallel to the direction of extension of the movement rod 86, 88. In this way, the friction of the protrusions 110 against the partition panels 21A, 21B is reduced.

Preferably, each roll 114 is made from a flexible material, typically elastomer.

Figure 7:
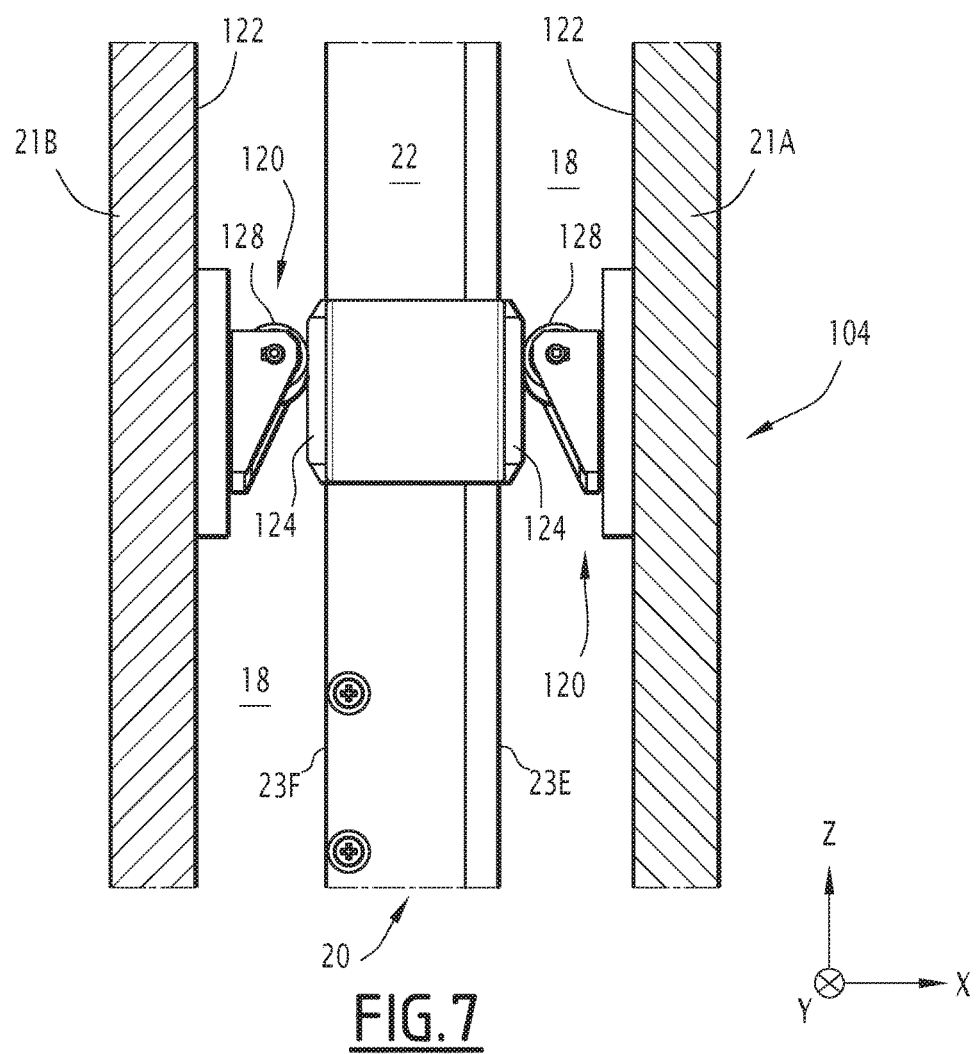
FIG. 7 is a cross-sectional view of the separating element along a plane marked VII-VII in FIG. 2.

In light of FIG. 7, the two second limiting means 104, also referred to as "secondary limiting member", comprises extensions 120, each of which is secured to an inner surface 122 of a partition wall 21A, 21B, oriented toward the space 18, and protruding from said inner surface 122 toward the inside of the space 18. The second limiting means 104 also comprises skates 124 secured to the first leaf portion 22.

The extensions 120 are grouped together in pairs, one extension 120 of each pair being secured to the front partition panel 21A and the other extension 120 being secured to the rear partition panel 21B. The extensions 120 of each pair are longitudinally aligned, i.e. the extensions 120 of each pair face one another inside the space 18. In the illustrated example, the second limiting means 104 comprise a single pair of extensions 120.

The extensions 120 are arranged along an edge 126 (visible in FIG. 2) of the partition 12 delimiting the passage 14.

Each skate 124 is mounted on the front 23E or rear 23F surface of the leaf portion 22. It is adapted to be sandwiched between the leaf portion 22 and one of the extensions 120 when the leaf 20 is in the closed position. To that end, it has a sufficient longitudinal thickness and is positioned along the outer edge 23B of the leaf portion 22.

The skates 124 are grouped together by pairs. One skate 124 of each pair is mounted on the front surface 23E of the leaf portion 22, the other skate 124 being mounted on the rear surface 23F. Like the extensions 120, the skates 124 of each pair are longitudinally aligned. In the illustrated example, the second limiting means 104 comprise a single pair of skates 124, adapted to cooperate with the single pair of extensions 120.

In this way, when the leaf 20 is in the closed position, it is longitudinally shimmed by the cooperation between the extensions 120 and the skates 124. Furthermore, the skates 124 provide a local overthickness to the leaf 20, which prevents the leaf 20 from rubbing against the extensions 120 when it is spaced away from the closed position.

Each extension 120 comprises a roll 128 defining a bearing surface against the associated skate 124. The roll 128 is adapted to roll against the skate 124 when the leaf 20 is moved. To that end, the axis of the roll 128 is oriented substantially horizontally.

Preferably, each roll 128 is made from a flexible material, typically elastomer.

In this way, the frictional forces between the extensions 120 and the skates 124 are reduced, which allows easy movement of the leaf 20.

Alternatively, the skates 124 are secured to the second leaf portion 24. The axis of each roll 128 is then oriented substantially vertically.

Figure 8:
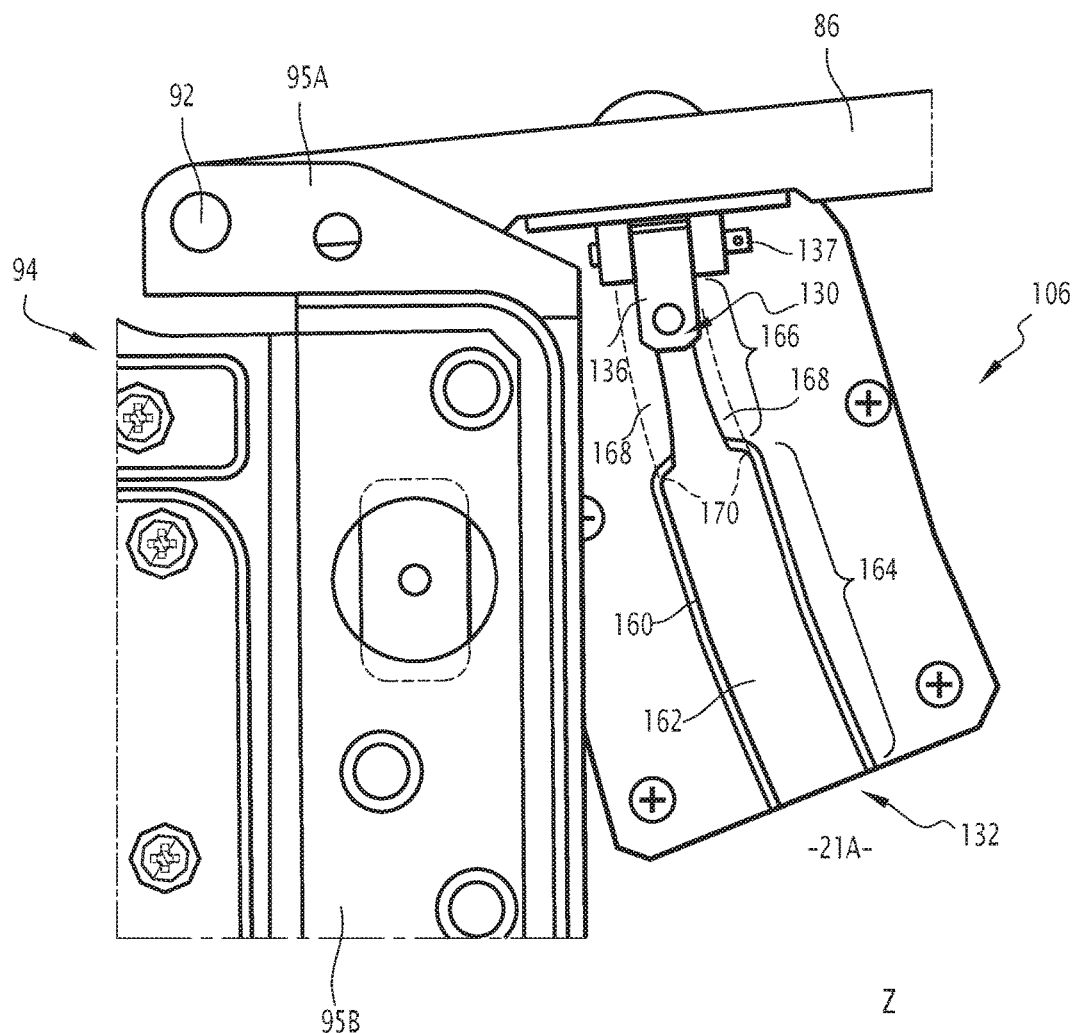
FIG. 8 is a view of a detail marked VIII in FIG. 2.

The third limiting means 106, also referred to as "tertiary limiting member", comprises, in light of FIGS. 8 and 9, a fastening member 130, secured to the mechanism 82, and a slide 132 for receiving the fastening member 130, formed in the partition 12.

The fastening member 130 is pivotably mounted on the mechanism 82 between an idle position, in which it is retracted substantially in the plane P defined by the mechanism 82, which therefore forms a retraction plane for the fastening member, and a position for longitudinally retaining the leaf 20, in which it is deployed substantially perpendicular to the plane P of the mechanism 82.

The fastening member 130 is adapted to be in the retaining position when the leaf 20 is in the closed position, and to be in the retracted position when the leaf 20 is in the open position.

To that end, the fastening member 130 is mounted on the upper movement push rod 86 of the mechanism 82, close to the point of articulation 92. It is made up of a slug 134 secured to a base 136 pivotably mounted around a shaft 137 on the push rod 86, said base 136 comprising a tab 138 oriented substantially perpendicular to the extension direction of the slug 134.

The slug 134 comprises a foot 140 for connecting to the base 136, a head 142 defining a free end of the slug 134, and an intermediate portion 144 comprised between the foot 140 and the head 142. The intermediate portion 144 has a smaller diameter than that of the head 142.

The shaft 137 extends parallel to the direction of extension of the push rod 86.

The tab 138 comprises a first surface 146, oriented toward the slot 134, and a second surface 148, opposite the first surface 146. In the idle position of the fastening member 130, the tab 138 is spaced away from the push rod 86. In the fastening position of the member 130, the second surface 148 of the tab 138 is pressed against the push rod 86.

The movement push rod 86 comprises means 150 for elastically biasing the tab 138 away from the push rod 86. The biasing means 150 are typically made up of a spring inserted between the tab 138 and the region of the push rod 86 against which the tab 138 is pressed in the position retaining the member 130.

The connecting element 94 comprises a rib 154 adapted to bear against the first surface 146 of the tab 138 when the member 130 is in the retaining position. To that end, the rib 154 protrude substantially vertically upward from an upper surface of the element 94. It comprises a beveled upper edge 156 defining a free end of the rib 154.

In particular, the rib 154 is secured to the support 95A.

During the passage of the leaf 20 from its open position to its closed position, the angle α (FIG. 2) formed between the connecting element 94 and the push rod 86 initially exceeds 100°. The rib 154 is then spaced away from the tab 138 and the fastening member 130 is in the idle position. When the angle α decreases and becomes less than 100°, the rib 154 progressively bears on the tab 138, as shown in FIG. 9, so that the member 130 pivots into the fastening position.

The slide 132 is arranged in the front partition panel 21A of the partition 12. Alternatively, it is formed in the rear partition panel 21B.

The slide 132 has a curved shape, for example in an arc of circle. Hereafter, the terms "wide," "width," and "side" should be understood following a direction perpendicular to the curved direction of extension of the slide 132.

The slide 132 delimits a groove 162 emerging through an opening 160 in the inner surface 122 of the partition panel 21A.

The slide 132 comprises a widened portion 164 for insertion of the fastening member 130 and a narrow portion 166 for locking the fastening member 130. The widened portion 164 is placed below the narrow portion 166. In the widened portion 164, the opening 160 has a width equal to or larger than the groove 162.

In the narrow portion 166, the opening 160 is formed between ribs 168 protruding from side walls 170 of the slide 132. In the narrow portion 166, the opening 160 thus has a width smaller than that of the groove 162. It in particular has a width smaller than the diameter of the head 142 of the slug 134.

The fastening member 130 is adapted so that the head 142 of the slug 134 enters the groove 162 at the widened portion 164 of the slide 132 in an intermediate position of the leaf 20 and then rises into the narrow portion 166. When the fastening member 130 is thus engaged in the narrow portion 166, the head 142 of the slug 134 is positioned in the groove 162, at the narrow portion 166. The intermediate portion 144 extends through the opening 160, and the ribs 168 oppose the head 142 leaving the slug 134 through the opening 160. The slide 132 therefore opposes the longitudinal disengagement of the fastening member 130 and, in the case of longitudinal force exerted on the leaf 20, the fastening member 130 cooperates with the slide 132 to limit the longitudinal travel of the leaf 20. This makes it possible to carry the longitudinal forces exerted on the leaf 20 essentially by the front partition panel 21A, and to limit the forces exerted on the rear partition panel 21B. In this way, it is possible to use a rear partition panel 21B that is lighter than the front partition panel 21A.

The separating element 10 also comprises a system 180 for adjusting the position of the leaf 20 relative to the movement mechanism 82 in two adjustment directions comprised in the transverse plane. The adjustment directions are preferably perpendicular to one another. In particular, a first adjustment direction is the vertical direction Z and the second adjustment direction is the transverse direction Y.

The adjustment system 180 comprises the support 95A, the clip 95B, and cam locks 182.

Figure 10:
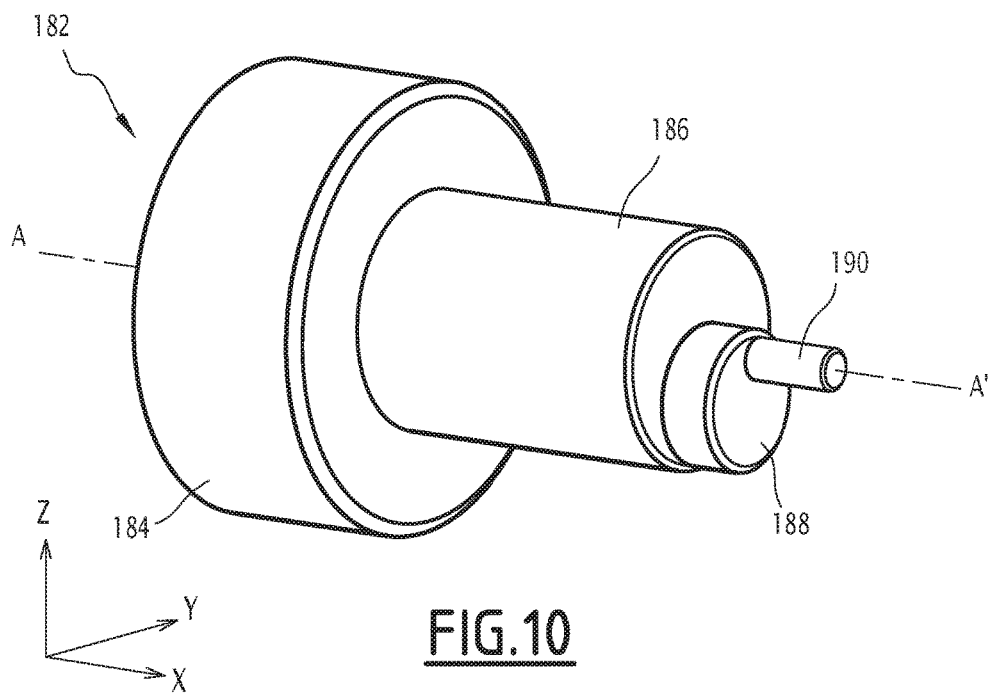
FIG. 10 is a three-quarters frontal perspective view of a cam lock of a system for adjusting the separating element of FIG. 1.

In reference to FIG. 10, each cam lock 182 comprises, alongside one another in that order along a main axis A-A' (also referred to as "cam axis"), a maneuvering head 184, centered on the axis A-A', a large cylinder portion 186, coaxial with the head 184, a small cylinder portion 188, off-center relative to the axis A-A', and a finger 190, centered on the axis A-A' of the large cylinder portion 186.

The head 184 and the finger 190 thus define opposite ends of the cam lock 182. The large and small cylinder portions 186, 188 constitute intermediate portions of the cam lock 182.

The head 184 has a larger diameter than that of the large cylinder portion 186, which itself is larger than that of the small cylinder portion 188, the latter in turn being larger than the diameter of the finger 190.

Figure 11:
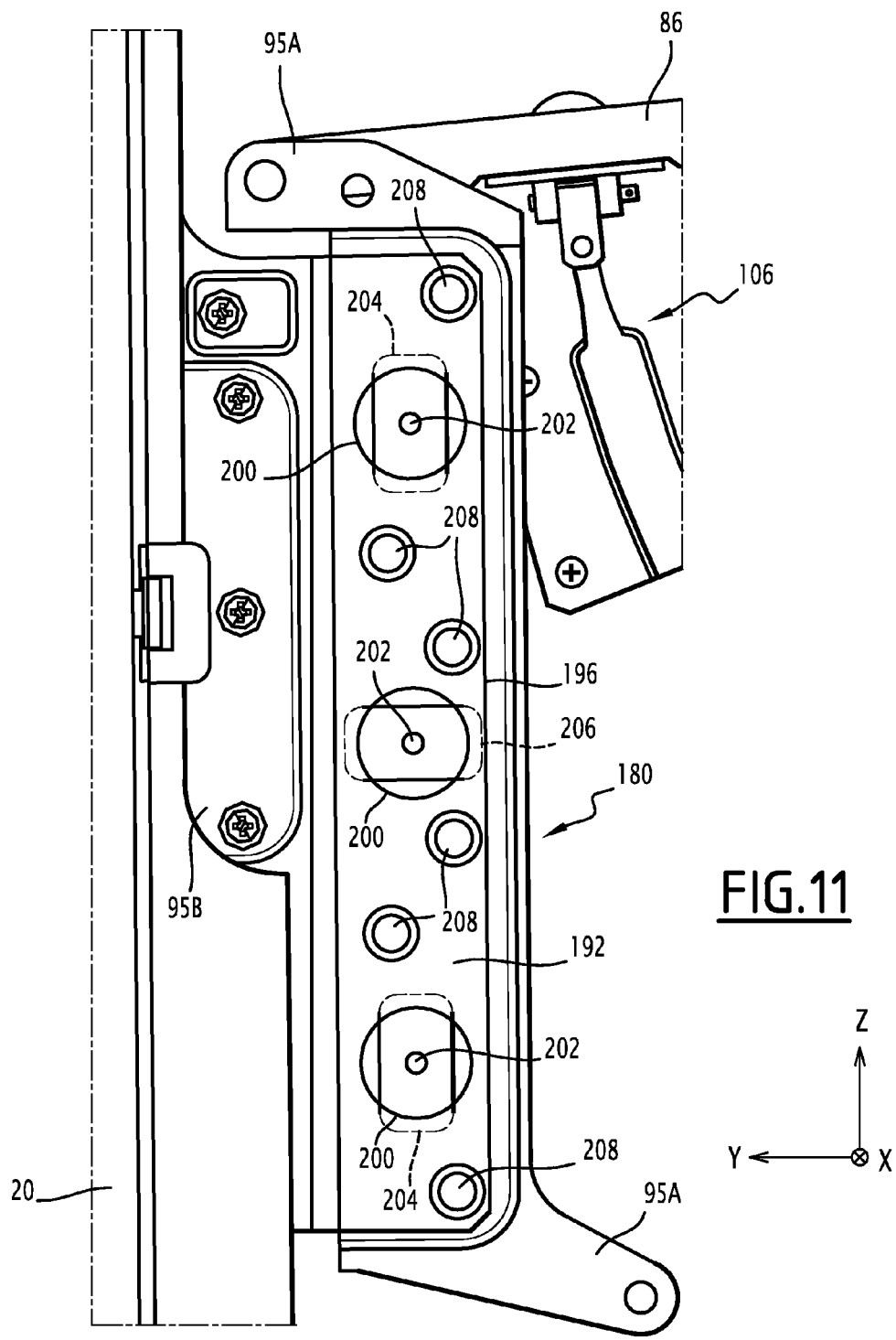
FIG. 11 is a front view of a detail marked XI in FIG. 2, certain adjustment elements having been removed.

In reference to FIG. 11, in which, for simplification reasons, the cam locks 182 have been omitted, the clip 95B comprises two flanges 192 sandwiching the support 95A. In other words, the support 95A is inserted between the two flanges 192 of the clip 95B. A first flange 192 of the clip 95B bears against a rear surface 196 of the support 95A. A second flange 192 of the clip 95B bears against a front surface 198 (FIG. 9) of the support 95A. Alternatively, the first flange 192 bears against the front surface 198 and the second flange 192 bears against the rear surface 196.

The first flange 192 defines a plurality of circular openings 200 for inserting the cam locks 182. Each opening 200 has a shape substantially complementary to that of the radial section of the large cylinder portion 186 of a cam lock 182. In particular, each opening 200 has a diameter substantially equal to that of said large cylinder portion 186.

The second flange 192 defines a plurality of openings 202 for receiving fingers 190 of the cam locks 182. Each opening 202 has a shape substantially complementary to that of the radial section of the finger 190 of a cam lock 182. In particular, each opening 202 has a diameter substantially equal to that of said finger 190.

The support 95B defines a plurality of through slots 204, 206 for receiving small cylinder portions 188 of the cam locks 182. Each slot 204, 206 has a substantially elongate straight section. The width of each slot 204, 206 is substantially equal to the diameter of the associated small cylinder portion 188.

At least two slots 204, 206 are elongated in different directions. A first slot 204 is elongated in the first adjustment direction, and a second slot 206 is elongated in the second adjustment direction. In the illustrated example, there are three slots 204, 206. The two end slots 204 are elongated in the first adjustment direction, to allow adjustment of the position of the leaf 20 in the second adjustment direction, and the slot of the middle 206 is elongated in the second adjustment direction, to allow adjustment of the position of the leaf 20 in the first adjustment direction.

In particular, each slot 204, 206 has an oblong shape.

Lastly, the flanges 192 and the support 95A together define openings 208 for the passage of elements (not shown) for tightening the clip 95B on the support 95A. These tightening elements are typically bolts.

A method for adjusting the position of the leaf 20 relative to the mechanism 82 will now be described, in light of FIGS. 8 and 9.

First, the cam locks 182 are inserted through the openings 200, 202 and slots 204, 206. The finger 190 is received in a receiving opening 202, the small cylinder portion 188 is housed in a slot 204, 206, and the large cylinder portion 186 extends through an insertion opening 200.

The head 184 of each cam lock 182 is been pivoted around the axis A-A'. This causes the small cylinder portion 188 to move perpendicular to the direction of elongation of the slot 204, 206, and therefore causes the support 95A to move relative to the clip 95B. When the leaf 20 is in the desired relative position relative to the mechanism 82, the tightening elements are tight and so that the clip 95B is kept immobile relative to the support 95A.

In reference to FIG. 2, the separating element 10 also comprises a system 210 for locking the leaf 20 in the open and closed positions. This locking system 210 comprises a movable locking member 212 secured to the leaf 20, two stationary locking members 214, 216 secured to the partition 12, and a device 218 for manually actuating a movable locking member 212.

A first stationary locking member 214 is adapted to cooperate with the movable locking member 212 to lock the leaf 20 in the closed position. A second stationary locking member 216 is adapted to cooperate with the movable locking member 212 to lock the leaf 20 in the open position.

As shown in FIG. 2, the stationary locking members 214, 216 have identical structures oriented perpendicular to one another.

Figure 12:
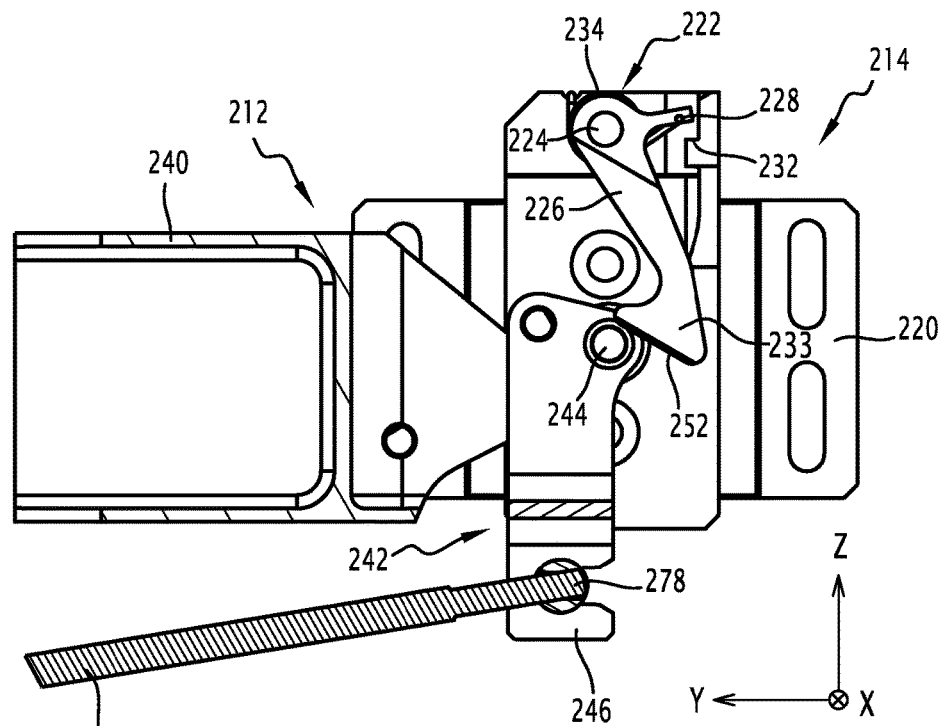
FIG. 12 is an elevation view, in partial cross-section, of part of a device for locking the separating element of FIG. 2, the locking device being in the process of being locked.
Figure 13:
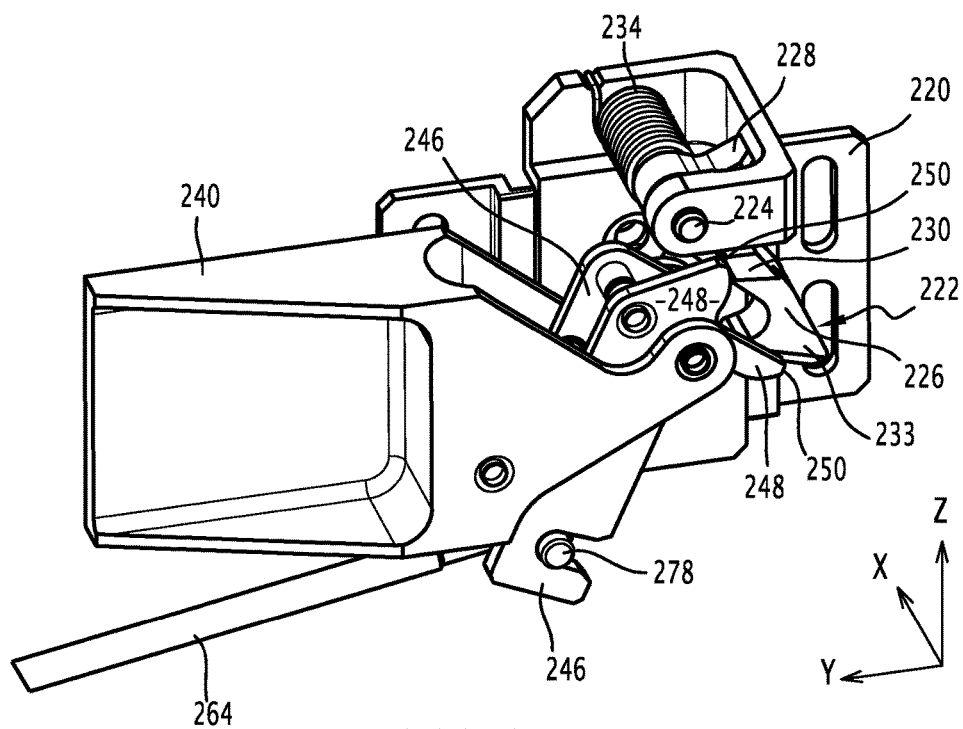
FIG. 13 is a rear perspective view of the locking device portion of FIG. 12, the locking device being in the process of being unlocked.

In reference to FIGS. 12 and 13, each stationary locking member 214, 216 comprises a platen 220 for fastening on the partition 12, a fastening member 222, articulated to the platen 220, and an articulation shaft 224 of the fastening member 222.

The platen 220, the fastening member 222 and the shaft 224 are identical for the two stationery locking members 214, 216. The orientation of the platen 220 of the stationery locking member 214 differs from that of the platen 220 of the stationery locking member 216. In particular, these orientations form an angle substantially equal to 90° between them.

The fastening member 222 comprises a body 226, elongated in a direction of extension of the fastening member 222, a fin 228 protruding transversely from the body 226, and a projection 230 longitudinally protruding from the body 226. The fastening member 222 is adapted to pivot on the shaft 224 between an idle position, in which the fin 228 bears against a stop surface 232 of the platen 220, and a retracted position, in which the fin 228 is spaced away from the stop surface 232.

A first end 233 of the body 226, forming a hook, is curved on a first side of the body 226.

Each stationary locking member 214, 216 also comprises means 234 for returning the fastening member 222 to its idle position. In the illustrated example, the return means 234 are made up of a spring positioned around the shaft 224.

In its idle position, the fastening member 222 of the first stationary locking member 212 is oriented substantially vertically, opposite the passage 14. In the idle position thereof, the fastening member 222 of the second stationary locking member 214 is oriented substantially horizontally, upwardly.

Still in reference to FIGS. 12 and 13, the movable locking member 212 comprises an arm 240 fastened on the leaf 20 and a lever 242 articulated on the arm 240.

The lever 242 is elongated. It is adapted to pivot relative to the arm 240 between an idle position, in which it is oriented substantially vertically, and an unlocked position, in which it is inclined relative to the vertical direction Z.

The lever 242 comprises a finger 244 adapted to cooperate with the fastening member 222 of each stationary locking member 214, 216 to lock the leaf 20 in the open or closed position. The finger 244 is stationary relative to the arm 240. The finger 244 defines the hinge pin of the lever 242 relative to the arm 240.

The lever 242 also comprises two flanges 246 framing the finger 244, each flange 246 being oriented substantially perpendicular to the finger 244. A flange 246 comprises two distinct appendages 248 each defining a cam surface 250. Each cam surface 250 is adapted to cooperate with the respective extension 230 of the fastening member 222 of one of the stationery locking members 214, 216 when the lever 242 is in the unlocked position, so as to stress the fastening member 222 toward the retracted position thereof. Owing to this configuration of the lever 242, it is possible to use stationary locking members 214, 216 having identical structures, which makes it possible to reduce the manufacturing costs of the locking system 210.

It will also be noted that the body 226 of each fastening member 222 also defines an inclined sliding surface 252 of the finger 244, at the first end thereof.

Figure 14:
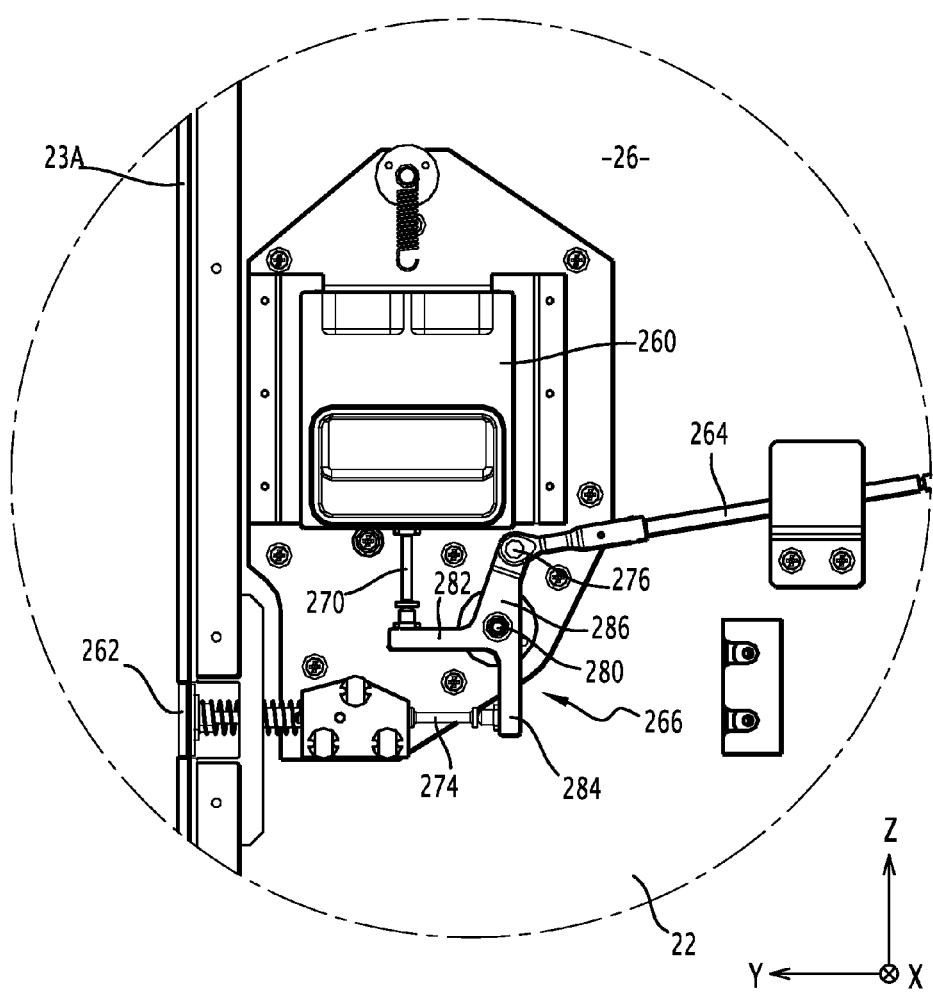
FIG. 14 is a view of a detail marked XIV of FIG. 2.

In reference to FIG. 14, the actuating device 218 is mounted on the first leaf portion 22. It comprises an actuating handle 260, a release button 262, a transmission push rod 264, and a bar 266 mechanically connecting the handle 260 and the button 262 to the push rod 264.

The handle 260 is movably mounted in vertical translation on the leaf portion 22. It is connected to the bar 266 by a connecting rod 270. The handle 260 is accessible only by the front 23E and rear 23F surfaces of the leaf portion 22. To that end, an opening 272 (FIG. 1) is formed in the front 23E and rear 23F surfaces of the leaf portion 22 to allow a user to grasp the handle 260.

The button 262 is placed on the inner lateral edge 23A of the leaf portion 22, in the trench thereof. It is accessible only through the trench of the leaf portion 22. It is connected to the bar 266 by a connecting rod 274.

The push rod 264 comprises a first point of articulation 276 on the bar 266, and a second point of articulation 278 (FIG. 12) on the lever 242 of the movable locking means 212.

The bar 266 is articulated on the leaf portion 22. It is pivotably mounted around a substantially longitudinal axis.

The bar 266 is generally in the shape of a T or a star with three branches. More generally, it is in the shape of a part with three arms connected to a central point 280 through which the hinge pin of the bar 266 passes on the leaf portion 22.

The bar 266 is connected by the free end of each of its arms, respectively, to the handle 260, the button 262, and the push rod 264. In particular, the free end of a first arm 282 is connected to the handle 260 using the rod 270, the free end of a second arm 284 is connected to the button 262 using the rod 274, and the free end of the third arm 286 constitutes a point of articulation 276 of the push rod 264 on the bar 266.

The bar 266 is adapted so that actuating the handle 260 or the button 262 causes the bar to rotate in the trigonometric direction and, subsequently, causes the points of articulation 276, 278 of the push rod 264 to move.

A method for locking the leaf 20 in the closed position will now be described, in reference to FIG. 12.

At the end of its movement toward the closed position, the first leaf portion 22 has a substantially vertical movement. The finger 244 of the movable locking number 212 then bears against the inclined surface 252. Under the effect of this bearing force, the fastening member 222 slides on the finger 244 toward its retracted position. Once the fastening member 222 is in its retracted position, the finger 244 no longer encounters any obstacles, and the leaf 20 can finish moving.

Once the leaf 20 is in the closed position, the finger 244 no longer bears on the fastening member 222. Under the effect of the return force exerted by the means 234, the fastening member 222 then returns to the idle position and grips the finger 244. The fastening member 222 then opposes a downward movement of the finger 244. The leaf 20 is locked in the closed position.

A method for unlocking the leaf 20 when it is in the closed position will now be described, in reference to FIGS. 13 and 14.

A user actuates the handle 260 by pulling it downward. In so doing, the bar 266 pivots around its axis in the trigonometric direction and the points of articulation 276, 278 of the push rod 264 are moved to the left.

Under the effect of this movement, the lower end of the lever 242 is pulled to the left, which causes the incline of the lever 242. A cam surface 250 then bears against the extension 230 of the fastening member 222, which causes the fastening member 222 to move into its retracted position. The fastening member 222 is then freed from the finger 244, which can be translated downwardly. The leaf 20 is then unlocked.

When the leaf 20 is in the open position, the handle 260 is not accessible. It is then no longer possible to unlock the leaf 20 by actuating the handle 260.

To unlock the leaf 20 when it is in the open position, the user must therefore push on the button 262. This is then accessible, as it is positioned on the trench of the leaf 20. In so doing, the bar 266 pivots around its axis in the trigonometric direction and the points of articulation 276, 278 of the push rod 264 are moved to the left. The unlocking method is then similar to that described above.

Figure 15:
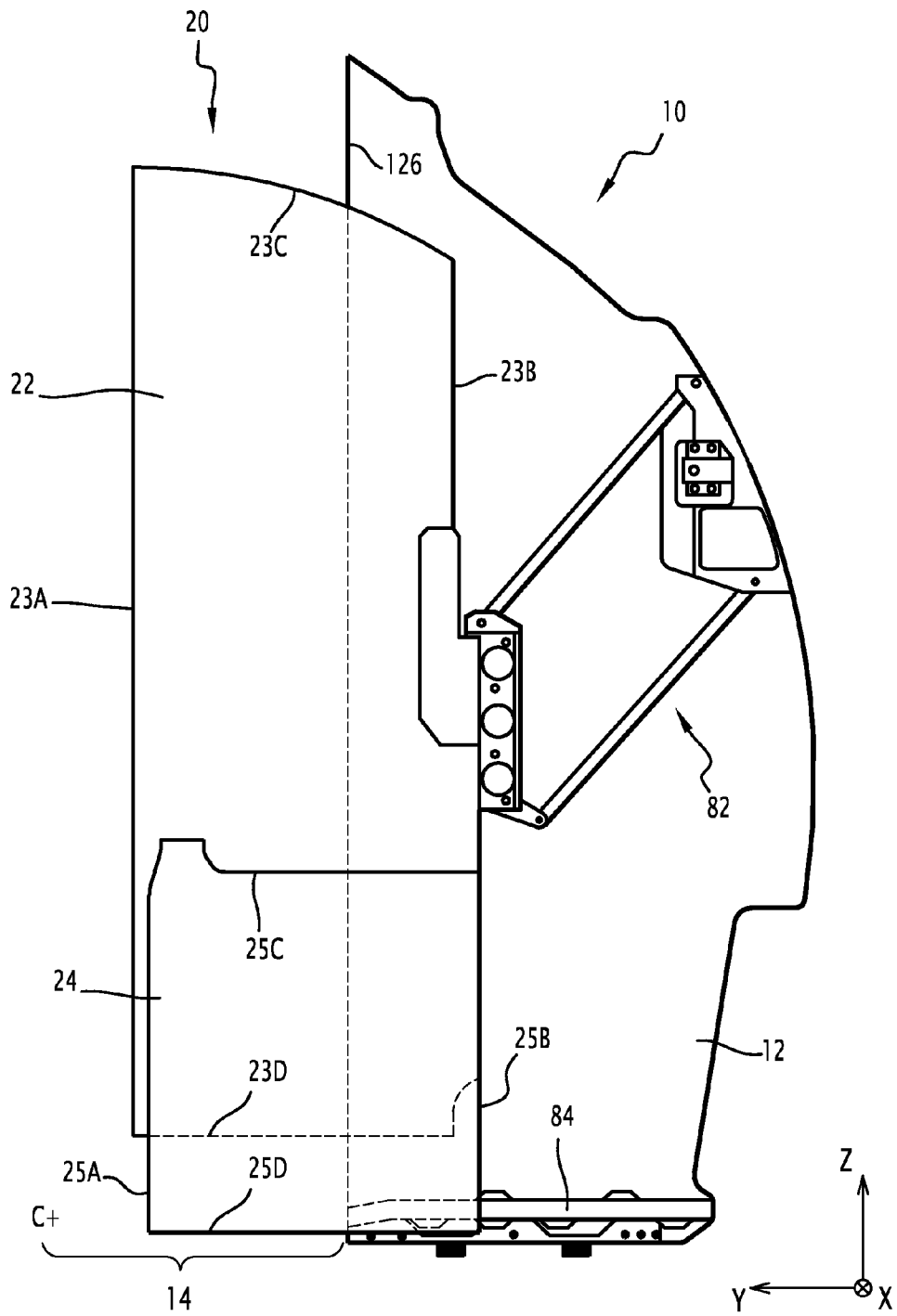
FIG. 15 is a simplified view similar to that of FIG. 2, the leaf being in the process of being opened.
Figure 16:
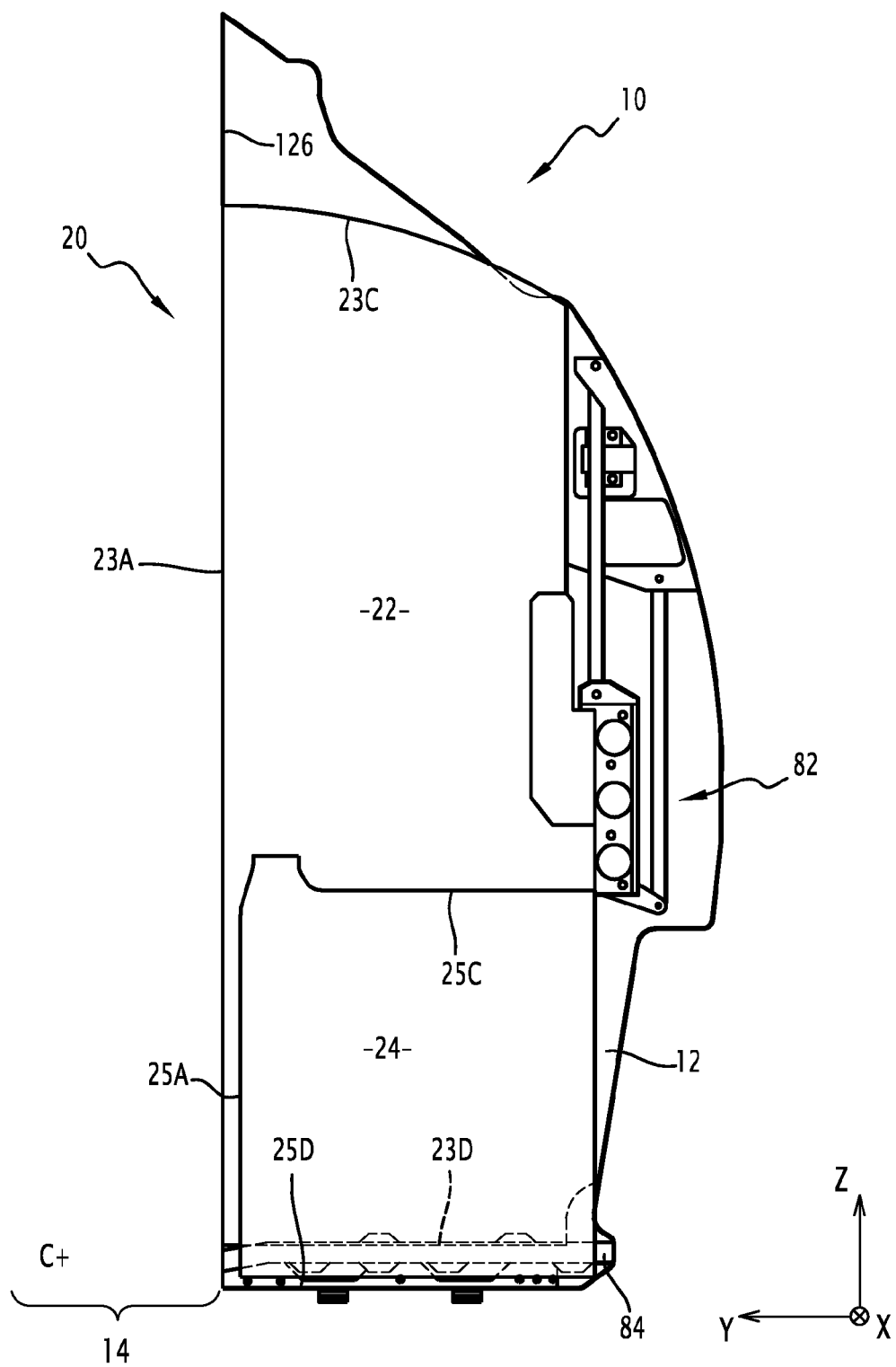
FIG. 16 is a view similar to that of FIG. 15, the leaf being in the open position.

A method for opening the leaf 20 will now be described, in light of FIGS. 2, 15 and 16.

First, the leaf 20 is locked in the closed position thereof, as shown in FIG. 2. It is therefore first unlocked, as described above, then a transverse force, oriented from the passage 14 toward the partition 12, is applied to it.

During the movement of the leaf 20, the movement push rods 86, 88 of the mechanism 82 remain parallel to one another. More generally, the mechanism 82 keeps a general parallelogram shape and thereby maintains the orientation of the first leaf portion 22 in relation to the stationary partition 12. The first leaf portion 22 thus undergoes a translation inside the transverse plane.

In particular, the point of articulation 92 of each movement push rod 86, 88 on the leaf 20 follows an arc of circle-shaped trajectory centered on the point 90 of articulation of the push rod 86, 88 on the stationary partition 12. The first leaf portion 22 therefore follows a substantially arc of circle-shaped movement inside the transverse plane.

Close to the closed position, the first leaf portion 22 thus has a substantially exclusively vertical movement, during which it begins to fit into the second leaf portion 24. The skates 124 then disengage from the extensions 120.

During this step, the movement member 48 bears against the inclined portion 62 of the guide 44 and the guide member 34 bears against one of the bars 36 of the slide 32, thereby biasing the second opening portion 24 transversely, which causes the transverse movement of the latter part relative to the first leaf portion 22. The movement member 48 then continues to descend along the guide 44 and, when it reaches the lower portion 64 of the guide 44, the relative movement of the leaf portions 22, 24 becomes exclusively vertical.

Close to the opening position, the movement of the first leaf portion 22 becomes substantially exclusively horizontal. The second leaf portion 24 is then in large part retracted inside the first leaf portion 22. The leaf 20 finishes by retracting inside the partition 12, and the movable locking member 212 comes into contact with the second stationary locking member 216 to lock the leaf 20 in the open position.

To conclude, a method for closing the leaf 20 will be described, in light of FIGS. 2, 9, 15 and 16.

The leaf 20 is first unlocked, as described above. Then, under the effect of the weight compensating means 96, the lower movement push rod 88 pivots around its hinge pin to the stationary partition 12 (pin passing through the point of articulation 90). The movement is transmitted to the movement push rod 86, which also pivots around its hinge pin to the stationary partition 12, by the support 95A. The movement push rods 86, 88 thus remain parallel to one another.

The push rods 86, 88 are guided inside the space 18 during their pivoting by the first limiting means 102. The rolls 114 of said first limiting means 102 roll against the surfaces 116 of the panels 21A, 21B of the stationary partition.

As in the opening method, the leaf portion 22 follows a substantially arc of circle-shaped trajectory. The direction of travel of that trajectory is, however, reversed.

The guide 42 bears against the movement member 46. At the same time, the guiding member 34 bears against one of the bars 36 of the slide 32. These forces exerted on the elements secured to the second leaf portion 24 cause the transverse movement of the leaf portion 24. The latter is then deployed outside the space 28.

During this deployment of the leaf portion 24, the guiding member 34 rises inside the slit 38 of the slide 32. At the same time, the movement members 46, 48 roll against the associated guides 42, 44, so as to control the relative transverse position of the leaf panels 22, 24. Lastly, the skates 74 slide against the slip bands 72, so as to avoid any longitudinal travel of the leaf portion 24 relative to the open portion 22.

In an intermediate position of the leaf, situated close to the closed position, the rib 154 of the connecting element 94 bears against the first surface 146 of the tab 138. Under the effect of this bearing force, the base 136 pivots on the axis 137 until the second surface 148 bears against the movement push rod 86. At the same time, the fastening member 130 is deployed outside the plane P of the mechanism 82 and returns into the slide 132 at the widened portion 164. The fastening member 130 then rises inside the slide 132, while continuing to deploy, until it reaches the narrow portion 166.

Close to the closed position, the tabs 124 are also inserted between the extensions 120, so as to contribute to the longitudinal shimming of the leaf 20 relative to the partition 12.

Lastly, the leaf 20 reaches its closed position, and is locked in that position according to the method described above.

The description of the right leaf 20 presented above also applies to the left leaf 20. The orientation terms "left" and "right" will simply need to be reversed, and the term "trigonometric" will need to be replaced by "clockwise."

Owing to the invention, the movement travel of the leaves 20 of the door 16 is maximized. It is thus possible to form a wider passage 14 at the center of the platform.

Furthermore, the separating element 10 is adapted so that the leaves 20 have a limited travel when they are in their open and closed positions. The qualitative output of the separating element 10 is thus improved.

Furthermore, the thickness of the separating element 10 is minimized, which makes it possible to limit the bulk of the separating element 10 in the cabin.

Additionally, the forces on the mechanism 82 and on the partition panels 21A, 21B are reduced, in particular using first and third travel limiting means 102, 106. The lifetime of the mechanism 82 is thus increased, and maintenance of the separating element 10 is reduced.

Lastly, the relative friction of the various moving parts against one another is reduced, which facilitates movement of the leaves 20 relative to the partitions 12, 13 and contributes to reducing maintenance of the separating element 10.

To conclude, the manufacturing costs of the separating element 10 are reduced.

The example described above constitutes one preferred alternative of the invention. However, alternatively, the means 80 for moving the leaf 20 may be motorized. A reversible motorized device, advantageously of the screw-nut type, is for example added to the gas cylinder 98 to allow automatic opening and closing of the leaves 20.

Also alternatively, the first and second points of articulation 90, 92 do not define a parallelogram, but a simple quadrilateral adapted to cause pivoting of the first leaf portion 22 around an axis parallel to the circulation axis C when the leaf 20 is moved between the open and closed positions thereof. Such pivoting of the first leaf portion 22 makes it possible to optimize storage of the leaf 20 inside the partition 12.

To that end, the distance between the first 90 and second 92 points of articulation of the upper push rod 86 is preferably larger than or smaller than the distance between the first 90 and second 92 points of articulation of the lower push rod 88.

Another embodiment of the separating element 10 is shown in FIGS. 17 to 23. This other embodiment differs from that described above in that the separating element 10 comprises a single leaf 20. As a result, modifications have been made to the mechanism 82. These differences are presented in more detail below.

Figure 17:
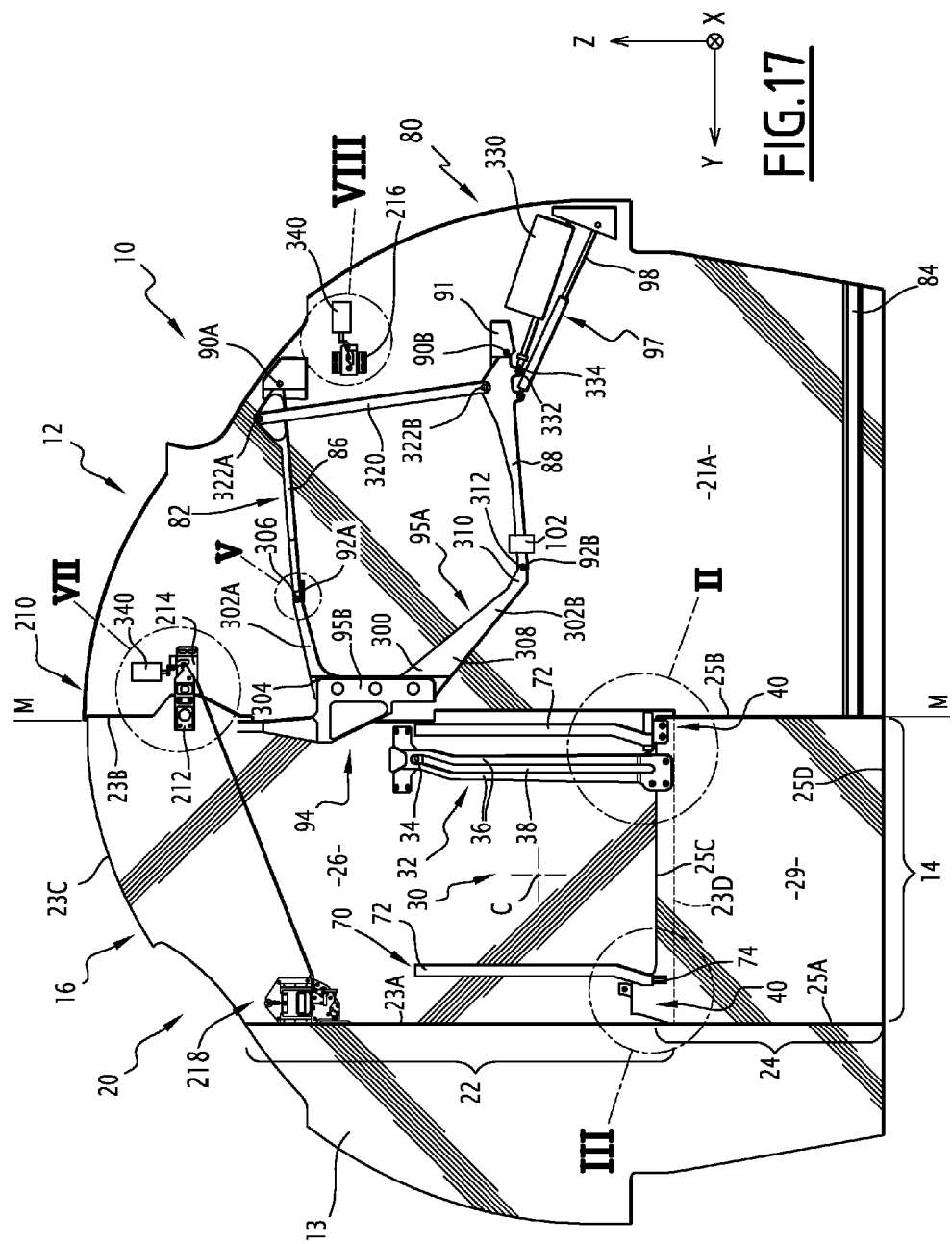
FIG. 17 is a rear elevation view of a separating element according to a second embodiment of the invention, one leaf of the separating element being in the closed position.

In reference to FIG. 17, in the southern embodiment, the partitions 12, 13 are asymmetrical relative to a middle longitudinal plane M of the fuselage, relative to which the fuselage is substantially symmetrical. A first stationary partition 12 extends transversely from the fuselage to the vicinity of the middle longitudinal plane M. The second stationary partition 13 extends transversely in the other half of the fuselage, between the fuselage and the passage 14. The circulation axis C is thus transversely offset relative to the middle longitudinal plane M.

The middle longitudinal plane M also constitutes a middle longitudinal plane of the separating element 10.

In the illustrated example, the first stationary partition 12 is on the right of the passage 14, and the second stationary partition 13 is on the left of the passage 14.

The door 16 is formed by the single leaf 20, movably mounted on the partition 12 between its the closed and open positions.

The width of the leaf 20 is defined as the smallest horizontal distance between the inner 23A, 25A and outer 23B, 25B lateral edges of the leaf portions 22, 24. The width of the leaf 20 thus defined is for example comprised between 20 and 30% of the width of the separating element 10.

The leaf 20 comprises the same relative vertical guide means 30 for the first portion 22 relative to the second portion 24, and the same first means 102 for limiting the travel of the leaf 20 along the circulation axis C as in the first embodiment.

As in the first embodiment, the mechanism 82 comprises two movement push rods 86, 88. Each push rod 86, 88 is articulated, at a first point of articulation 90A, 90B, to a stationary point of the partition 12, and, at a second point of articulation 92A, 92B, to a point jointly movable with the first leaf portion 22, by means of the connecting element 94.

The first points of articulation 90A, 90B are spaced apart from one another. Likewise, the second points of articulation 92A, 92B are spaced apart from one another.

Preferably, the first points of articulation 90A, 90B are stationary points of the stationary partition 12.

The first points of articulation 90A, 90B are vertically offset relative to one another, i.e. they are not positioned in a same horizontal plane. A first upper point of articulation 90A, and a first lower point of articulation 90B, are thus defined.

Furthermore, the first points of articulation 90A, 90B are transversely offset relative to one another, i.e. they are not positioned in a same vertical plane. In particular, the first lower point of articulation 90B is transversely offset to the right relative to the first upper point of articulation 90A.

The second points of articulation 92A, 92B are also vertically offset relative to one another. As for the first points of articulation, a second upper point of articulation 92A and a second lower point of articulation 92B are therefore also defined.

An upper movement push rod 86 is articulated to the stationary partition 12 and to the leaf 20 by means of the upper points of articulation 90A, 92A. A lower movement push rod 88 is articulated to the stationary partition 12 and to the leaf 20 by means of the lower points of articulation 90B, 92B.

The first points of articulation 90A, 90B together define a first direction, and the second points of articulation 92A, 92B together define a second direction, substantially parallel to the first direction. Furthermore, the gap between the first points of articulation 90A, 90B is substantially equal to the gap between the second points of articulation 92A, 92B. Thus, the points of articulation 90A, 90B, 92A, 92B form the four apices of a first parallelogram.

As a result, the push rods 86, 88 are substantially parallel to one another and are adapted to remain substantially parallel when the leaf 20 moves from the open position to the closed position thereof. Furthermore, the lengths separating the first and second points of articulation, respectively 90A, 92A, 90B, 92B of each push rod 86, 88, respectively, are substantially equal.

The mechanism 82 is thus substantially in the shape of a parallelogram.

It will be noted that, in the illustrated example, the first and second points of articulation 90A, 90B, 92A, 92B make up the ends of each push rod 86, 88. It will also be noted that the lengths of the push rods 86, 88 are substantially equal.

As in the first embodiment, the connecting element 94 comprises a support 95A, secured to the mechanism 82, and a clip 95B, secured to the first leaf portion 22, sandwiching the support 95A.

Specifically to this second embodiment, the support 95A has a substantially trapezoidal shape. It comprises a body 300, extending inside the clip 95B, and two stationary arms 302A, 302B extending transversely from the body 320 toward the inside of the partition 12.

The arms 302A, 302B comprise an upper arm 302A, articulated to the upper movement push rod 86, and a lower arm 302B, articulated to the lower movement push rod 88.

The upper arm 302A is substantially rectilinear. It comprises a first end 304 for connecting to the body 100, and a second end 306 opposite the first end 304. The second upper point of articulation 92A is positioned at the second end 306.

The lower arm 302B comprises a main segment 308 for connecting to the body 300, which is substantially rectilinear, and a bent end segment 310. The second lower point of articulation 92B is positioned at an end of the end segment 110 opposite the end for connecting the segment 110 to the main segment 108.

This trapezoidal configuration of the support 95A makes it possible to form an interval for receiving the lower push rod 88 between the arms 302A, 302B be when the leaf 20 is in the open configuration.

Still specifically to the second embodiment, the mechanism 82 also comprises a coordinating push rod 320 articulated to each of the movement push rods 86, 88. Each movement push rod 86, 88, respectively, is articulated to the coordinating push rod 320 by a third point of articulation 322A, 322B, respectively.

This coordinating push rod 320 makes it possible to ensure the continuity of the traveling movement of the leaf 20 when the first and second points of articulation 90A, 90B, 92A, 92B are aligned with one another. For each movement push rod 86, 88, the first 90A, 90B, second 92A, 92B and third 322A, 322B points of articulation are not aligned. In particular, for each movement push rod 86, 88, respectively, the third point of articulation 322A, 322B, respectively, is upwardly offset relative to the line defined by the first and second points of articulation 90A, 92A, 90B, 92B, respectively, when the leaf 20 is in the closed position.

For each movement push rod 86, 88, the distance separating the third point of articulation 322A, 322B from the first point of articulation 90A, 90B is smaller than the distance separating the third point of articulation 322A, 322B from the second point of articulation 92A, 92B.

The third points of articulation 322A, 322B together define a third direction, which is substantially parallel to the first direction. The mechanism 82 is adapted so that the third direction remains substantially parallel to the first direction all throughout the movement of the leaf 20.

In particular, the third points of articulation 3228, 322B define the apices of a second parallelogram with the first points of articulation 90A, 90B. In this way, irrespective of the position of the leaf 20, at least one of the first and second parallelograms is not flat. This guarantees that the movement of the leaf 20 will continue.

Figure 18:
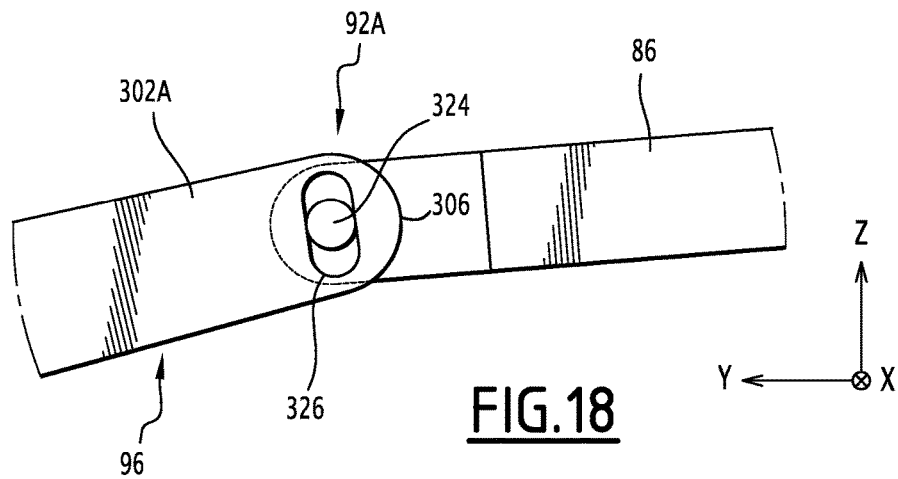
FIG. 18 is a view of a detail marked XVIII in FIG. 17.

As shown in FIG. 18, the second upper point of articulation 92A is formed by the cooperation of a finger 324 with an oblong opening 326.

The finger 324 is supported by the push rod 86. It extends through the oblong opening 326. It is oriented longitudinally. It typically extends between two flanges (not shown) of the push rod 86.

The oblong opening 326 is formed in the support 95A. It is oriented longitudinally. It is a through opening and emerges in a front surface and a rear surface (not shown) of the support 95A. The oblong opening 326 is elongated parallel to the third direction.

Alternatively, the oblong opening 326 is replaced by an elastic element of the silent block type, or by a push rod inserted between the arm 302A and the push rod 86.

Thus, a degree of translational freedom between the push rod 86 and the support 95A is formed at the second upper point of articulation 92A. This makes it possible to offset any defects in the length of the pieces 86, 88, 95A, 320 of the mechanism 82 and allows functional play during the movement of the leaf 20. This also facilitates the assembly of the elements of the mechanism 82 during manufacture of the separating element 10.

Alternatively, by replacing the degree of translational freedom formed at the second upper point of articulation 92A, a degree of translational freedom between the push rod 88 and the support 96 is formed at the second lower point of articulation 92B. This degree of freedom is for example formed by the cooperation of a finger and an oblong opening, or by an elastic element of the silent block type, or by a push rod inserted between the arm 102B and the push rod 88.

Moreover, the movement means 80 are motorized here. To that end, they comprise a motorized linear actuator 330 adapted to drive the movement of the leaf 20 by means of the mechanism 82.

The actuator 330 is fastened to the partition 12 and is articulated to one of the movement push rods 86, 88. In the illustrated example, it is articulated to the lower push rod 88, by means of a fourth point of articulation 332.

The fourth point of articulation 332 is placed close to the first lower point of articulation 90B. It is also placed close to the third point of articulation 322B. It is made up of a pivot link between the actuator 330 and the push rod 88, formed on a protuberance 334 of the lower pushrod 88.

The actuator 330 is made up of a reversible motorized system that can be maneuvered manually in the event of a breakdown of the motor or of the power source controlling the motorized system, for example in case of power outage. In particular, in the illustrated example, the actuator 130 is made up of a screw-nut electrical system.

The system 210 for locking the leaf 20 in the open and closed positions also differs from that described in the first embodiment in that the locking system 210 is motorized here.

Figure 19:
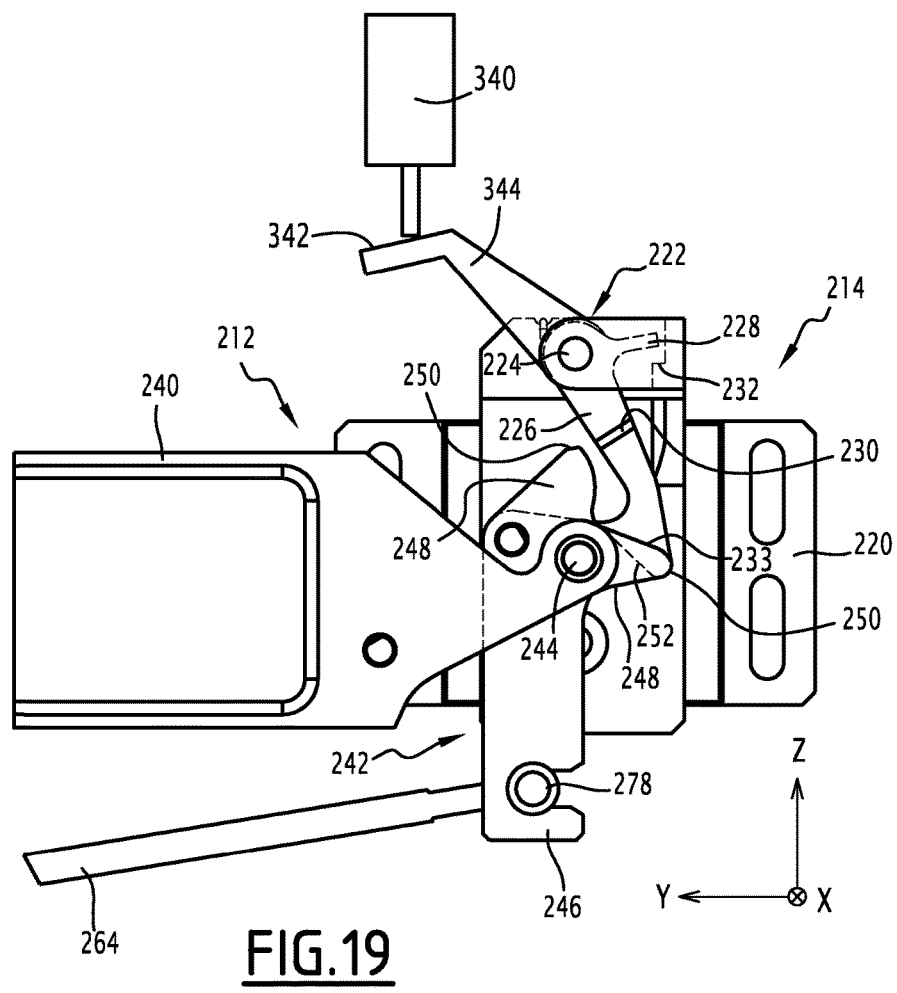
FIG. 19 is a view of a detail marked XIX in FIG. 17.
Figure 20:
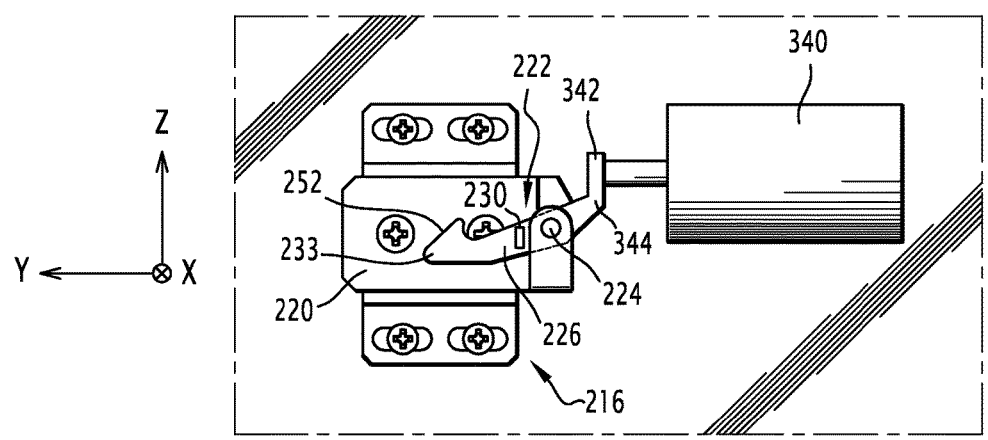
FIG. 20 is a view of a detail marked XX in FIG. 17.
Figure 21:
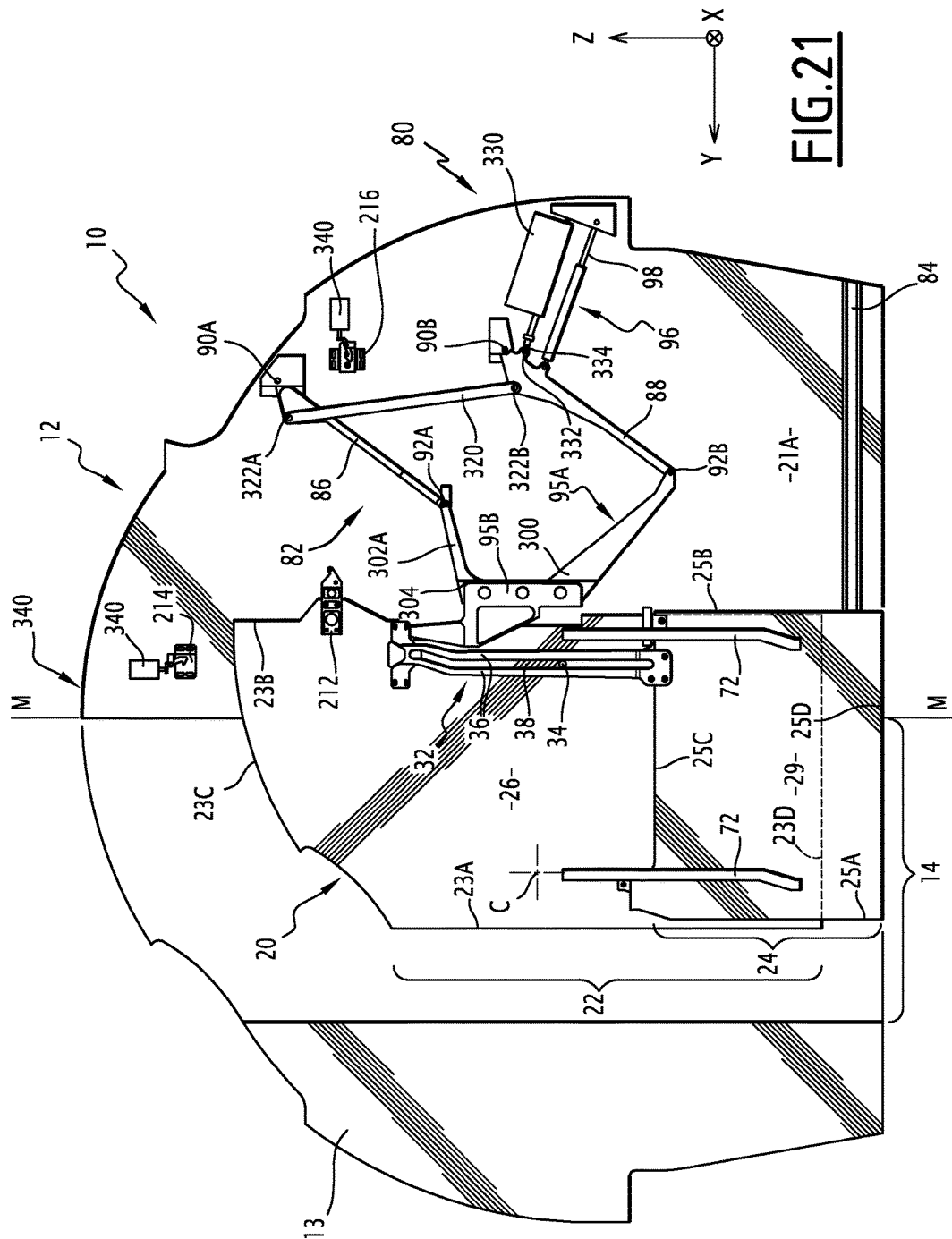
FIG. 21 is a view similar to FIG. 17, the leaf being in an intermediate position.
Figure 22:
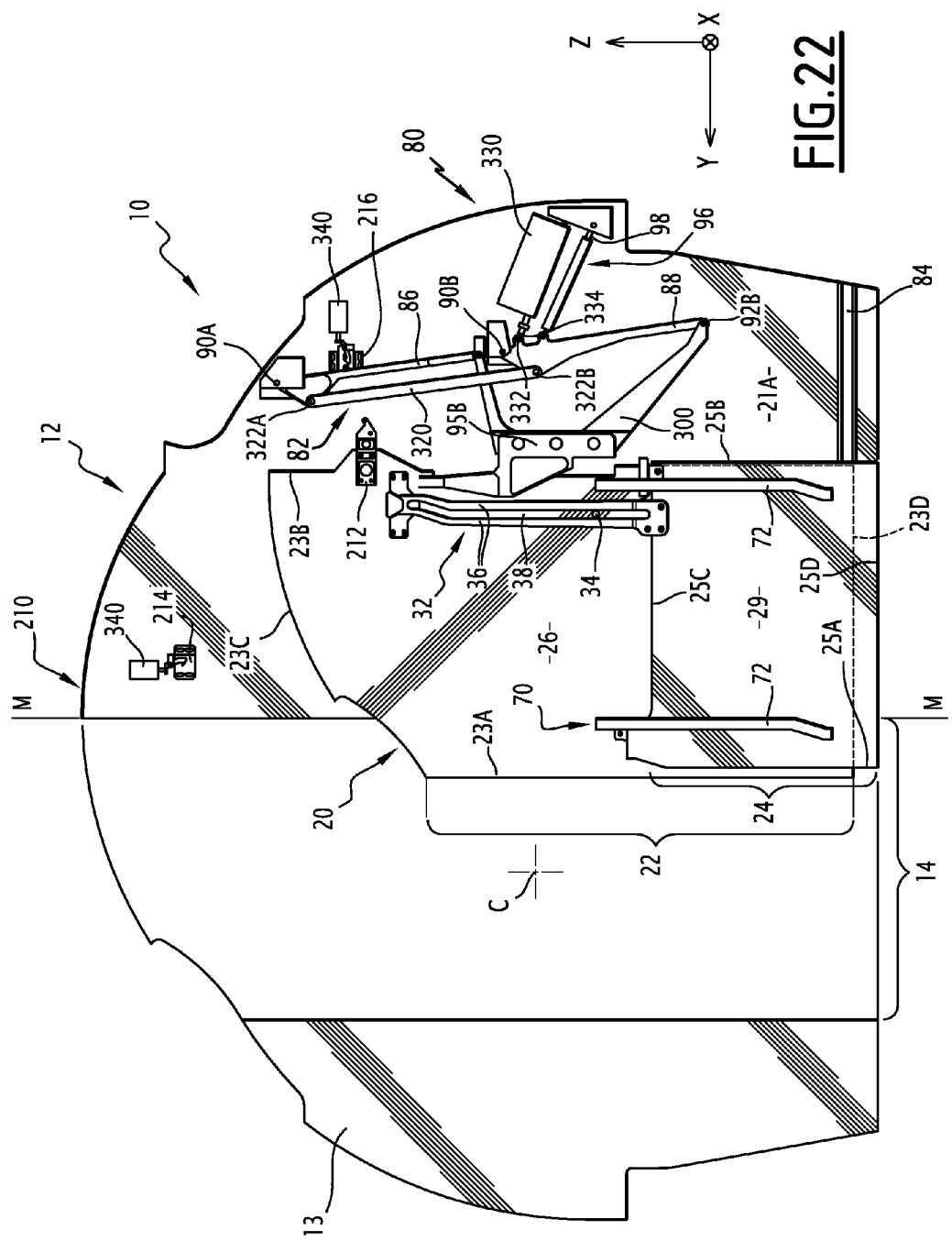
FIG. 22 is a view similar to FIG. 17, the leaf being in another intermediate position.

In reference to FIGS. 19 and 20, to that end, the locking system 210 comprises stationery locking members 214, 216 in addition to the movable locking member 212 and automatic actuating devices 340 for the stationery locking members 214, 216 in addition to the manual actuating device 218.

Each automatic actuating device 340 is adapted to exert a force on the fastening member 222 of a stationary locking member 214, 216, so as to bias the fastening member 222 in its retracted position. In particular, the actuating device 340 is adapted to exert said force on an appendage 342 of the fastening number 222, said appendage 342 protruding from a second end 344 of the body 226, opposite the first end 233, toward the first side. This force is oriented toward the first end 233 such that, under the effect of said force, the locking member 222 pivots around the associated shaft 224. This force opposes that exerted by the return means 234.

Each actuating device 340 is preferably formed by a motorized linear actuator.

A method for opening the leaf 20 will now be described, in light of FIGS. 17 and 19 to 23.

First, the leaf 20 is locked in the closed position thereof, as shown in FIG. 17. It is therefore initially unlocked.

To that end, a current is injected into the actuator 340 associated with the stationery locking member 214, under the effect of which the actuator device 340 bears on the protuberance 342. Under the effect of this bearing, the fastening member 222 pivots around the shaft 224 toward the retracted position thereof. The first end 227 is then disengaged from the finger 244. The fastening member 222 then no longer prevents the finger 244 from being moved downward. The movable locking member 212 is thus downwardly translationally free. The leaf 20 is unlocked.

The actuator 330 is then activated and biases the lower movement push rod 88 so as to pivot it in the trigonometric direction around the point of articulation 90B. The force exerted by the actuator 330 is also transmitted to the upper movement push rod 86 by means of the support 95A and the coordinating push rod 320. Under the effect of this force, the upper push rod 86 also pivots around the point of articulation 90A so as to remain parallel to the lower push rod 88. In particular, the direction of rotation of the upper push rod 86 around the point of articulation 90A is the same as the direction of rotation of the lower push rod 88 around the point of articulation 90B.

During the movement of the leaf 20, the movement push rods 86, 88 of the mechanism 82 thus remain parallel to one another. More generally, the mechanism 82 remains generally in the shape of a parallelogram and thus maintains the orientation of the first leaf portion 22 relative to the stationary partition 12. The first leaf portion 22 thus preserves its orientation within the transverse plane, and in particular remains vertical.

In particular, the second point of articulation 92A, 92B of each movement push rod 86, 88 follows a trajectory in the shape of an arc of circle centered on the first point of articulation 90A, 90B of said push rod 86, 88. The first leaf portion 22 therefore follows a substantially arc of circle-shaped movement inside the transverse plane.

Near the closed position, the first leaf portion 22 thus has a substantially exclusively vertical movement, during which it starts to fit into the second leaf portion 24.

The leaf 20 then successively passes through a first intermediate position (not shown), in which the first point of articulation 90A, 90B of each movement push rod 86, 88 is vertically aligned with the second point of articulation 92A, 92B of said push rod 86, 88. The leaf 20 then passes through a second intermediate position flattening the first parallelogram, shown in FIG. 22, in which the first 90A, 90B and second 92A, 92B points of articulation of the two movement push rods 86, 88 are aligned with one another.

In the second intermediate position, the second parallelogram is not flattened, so that the movement of the leaf 20 can continue beyond the second intermediate position without a risk of blocking the mechanism 82.

Beyond the second position, the parallelogram formed by the points of articulation 90A, 92A, 90B, 92B reverses itself relative to the parallelogram formed below the second position. In particular, below the second position, the second points of articulation 92A, 92B are situated on the first side of the line passing through the first points of articulation 90A, 90B. Beyond the second position, the second points of articulation 92A, 92B are situated on a second side of the line passing through the first points of articulation 90A, 90B.

These kinematics make it possible to maximize the travel of the leaf 20 while being compatible with the limited space available for that travel in the fuselage.

Near the first intermediate position, the movement of the first leaf portion 22 is substantially exclusively horizontal. The second leaf portion 24 is then largely retracted inside the first leaf portion 22, and the first leaf portion 22 is at its lowest.

For the end of the opening movement, between the first intermediate position and the open position, the first leaf portion 22 rises while the leaf 20 finishes retracting inside the partition 12. The leaf 20 crosses the second intermediate position, then the movable locking member 212 finally comes into contact with the second stationary locking member 216 to lock the leaf 20 in the open position.

To finish, a method for closing the leaf 20 will be described, in light of FIGS. 17 and 21 to 23.

The leaf 20 is first unlocked, as described above. The actuator 130 is then deployed and stresses the lower push rod 88 so as to pivot it in the clockwise direction around the point of articulation 90B. The movement is transmitted to the push rod 86, which pivots around the point of articulation 90A, by the support 95A and by the coordinating push rod 320. The push rods 86, 88 thus remain parallel to one another.

As in the opening method, the leaf portion 22 follows a substantially arc of circle-shaped path while preserving its vertical orientation. The direction of travel of this path is, however, reversed.

Lastly, the leaf 20 reaches its closed position, and the movable locking member 212 comes into contact with the first stationary locking member 214 to lock the leaf 20 in the closed position.

This second embodiment makes it possible to maximize the width of the passage 14 when the door 16 is made up of a single leaf 20.

Moreover, the mechanism 82 is easy to maneuver and has reduced blockage risks.

Furthermore, the mechanism 82 is particularly light and takes up less space when the leaf 20 is in the retracted configuration.

Lastly, the motor means for the movement means 80 are particularly easy to install, as they only require actuators that are readily commercially available and inexpensive.

In the description of the second embodiment provided above, the leaf 20 retracts inside the right partition 12. In one alternative, the leaf 20 retracts inside the left partition 13. The description provided above also applies to this case, the orientation terms "left" and "right" on the one hand, and "trigonometric" and "clockwise" on the other hand, then simply needing to be inverted.

Furthermore, in the description of the second embodiment provided above, the separating element 10 is installed between the fuselage and a cabin floor. In one alternative, the separating element 10 is installed between the fuselage and a cabin ceiling. The description provided above also applies to this case, the orientation terms "upper" and "lower" on the one hand, and "trigonometric" and "clockwise" on the other hand, then simply needing to be inverted.

The invention claimed is:

1. An aircraft cabin comprising at least one separating element, said separating element including:
   at least one stationary partition, delimiting a passage defining a circulation axis inside the cabin;
   at least one leaf, mounted transversely movable relative to the circulation axis between a closed position, in which it extends through the passage, and an open position, in which it is positioned at least partially spaced away from the passage, the or each leaf comprising at least one leaf portion; and
   a movement system for moving the or each leaf between the closed position and the open position thereof, the or each leaf being adapted to move along the plane transverse to the circulation axis, wherein the movement system comprises, for the or each leaf, a movement mechanism for moving a driven leaf portion of the at least one leaf portion of the leaf, the movement mechanism comprising two push rods each articulated, by a first point of articulation, to a respective stationary partition among the at least one stationary partition, and by a second point of articulation to a connecting element which is fixed relatively to the driven leaf portion, the first points of articulation being spaced apart from one another, the push rods being substantially parallel to one another and being adapted to remain substantially parallel during the movement of the leaf from the open position to the closed position thereof.

2. The aircraft cabin according to claim 1, wherein the points of articulation form the four apices of a parallelogram irrespective of the position of the leaf.

3. The aircraft cabin according to claim 1, wherein the separating element comprises, for the or each leaf, a limiting member for limiting the travel of the leaf along the circulation axis, said limiting member having at least one protrusion secured to one of the push rods and adapted to bear against the respective stationary partition.

4. The aircraft cabin according to claim 1, wherein the respective stationary partition has two partition panels delimiting a space between them for receiving the leaf when it is in the open position, and the separating element has, for the or each leaf, a limiting member for limiting the travel of the leaf along the circulation axis, said limiting member having at least two extensions, each secured to one of the partition panels, and at least two skates secured to the driven leaf portion of the leaf, each skate being adapted to be sandwiched between one of said extensions and the driven leaf portion when the leaf is in the closed position.

5. The aircraft cabin according to claim 1, wherein the separating element comprises, for the or each leaf, a limiting member for limiting the travel of the leaf along the circulation axis, said limiting member including a fastening member jointly movable with the movement mechanism and a slide for receiving the fastening member, formed in the respective stationary partition, the fastening member cooperating with the slide between an intermediate position of the leaf and the closed position to prevent the leaf from moving away from the respective stationary partition when the leaf is in the closed position.

6. The aircraft cabin according to claim 5, wherein the fastening member is pivotably mounted on the movement mechanism between an idle position, in which is retracted substantially in a plane defined by the movement mechanism, and a position retaining the leaf, in which it is deployed substantially perpendicular to said plane.

7. The aircraft cabin according to claim 1, wherein the connecting element comprises an adjustment system for adjusting the position of the leaf relative to the movement mechanism along two axes comprised in the transverse plane.

8. The aircraft cabin according to claim 7, wherein the adjustment system includes a support secured to one of the movement mechanism and the driven leaf portion, a flange secured to the other of the driven leaf portion and the movement mechanism, and at least one cam lock, the or each cam lock having a larger cylinder portion and a smaller cylinder portion that is off-center relative to the larger cylinder portion, the flange having at least one opening in which the larger cylinder portion is received, said opening having a shape substantially complementary to the shape of a radial section of the larger cylinder portion, and the support having at least one elongate slot in which the smaller cylinder portion is received, said slot having a width smaller than the diameter of the opening, so that, when the cam lock is pivoted along an axis which is coaxial with the larger cylinder portion, the smaller cylinder portion is moved perpendicular to the direction of elongation of the slot, thus causing movement of the support relatively to the flange.

9. The aircraft cabin according to claim 1, wherein the at least one stationary partition comprises a first stationary partition and a second stationary partition opposite the first stationary partition, the passage being delimited between the first and second stationary partitions.

10. The aircraft cabin according to claim 9, wherein the at least one leaf comprises two opposite leaves.

11. The aircraft cabin according to claim 1, wherein the separating element comprises, for the or each leaf, a locking system for locking the leaf in the open position and in the closed position, the locking system having a movable locking member secured to the leaf and two stationary locking members secured to the respective stationary partition, one of the stationary locking members cooperating with the movable locking member to lock the leaf in the open position, and the other one of the stationary locking members cooperating with the movable locking member to lock the leaf in the closed position.

12. The aircraft cabin according to claim 3, wherein the protrusion comprises a rolling member.

* * * * *